(12) United States Patent
Chen et al.

(10) Patent No.: US 11,703,939 B2
(45) Date of Patent: Jul. 18, 2023

(54) SIGNAL PROCESSING DEVICE AND RELATED PRODUCTS

(71) Applicant: SHANGHAI CAMBRICON INFORMATION TECHNOLOGY CO., LTD, Shanghai (CN)

(72) Inventors: Tianshi Chen, Shanghai (CN); Shuai Hu, Shanghai (CN); Shengyuan Zhou, Shanghai (CN); Xishan Zhang, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/620,540

(22) PCT Filed: Oct. 30, 2018

(86) PCT No.: PCT/CN2018/112528
§ 371 (c)(1),
(2) Date: Apr. 6, 2021

(87) PCT Pub. No.: WO2020/062392
PCT Pub. Date: Apr. 2, 2020

(65) Prior Publication Data
US 2021/0341989 A1    Nov. 4, 2021

(30) Foreign Application Priority Data

Sep. 28, 2018  (CN) .......................... 201811145439.8
Sep. 28, 2018  (CN) .......................... 201811145756.X
Sep. 28, 2018  (CN) .......................... 201811152999.6

(51) Int. Cl.
*G06F 3/01*      (2006.01)
*G06N 20/00*     (2019.01)
(Continued)

(52) U.S. Cl.
CPC ................ *G06F 3/01* (2013.01); *G06F 40/30* (2020.01); *G06N 3/06* (2013.01); *G06N 20/00* (2019.01);
(Continued)

(58) Field of Classification Search
None
See application file for complete search history.

(56) References Cited

U.S. PATENT DOCUMENTS 5,052,043 A    9/1991  Gaborski
6,144,977 A    11/2000 Giangarra et al.
(Continued)

FOREIGN PATENT DOCUMENTS

CN    1503858 A    6/2004
CN    1503958 A    6/2004
(Continued)

OTHER PUBLICATIONS

Iqbal, "Using Feature Weights to Improve Performance of Neural Networks," Jan. 25, 2011, https://arxiv.org/abs/1101.4918.*
(Continued)

*Primary Examiner* — Ryan Barrett
(74) *Attorney, Agent, or Firm* — Rimon PC

(57) ABSTRACT

The present disclosure provides a signal processing device, including a signal collector, an instruction converter, and a processor. Examples of the present disclosure may achieve precise recognition of users' intentions and bring operational conveniences to users.

14 Claims, 20 Drawing Sheets

(51) Int. Cl.
*G06F 40/30* (2020.01)
*G06N 3/06* (2006.01)
*G10L 15/22* (2006.01)
*G10L 15/26* (2006.01)
*G06V 40/20* (2022.01)

(52) U.S. Cl.
CPC .............. *G06V 40/20* (2022.01); *G10L 15/22* (2013.01); *G10L 15/26* (2013.01); *G10L 2015/223* (2013.01)

(56) References Cited

U.S. PATENT DOCUMENTS

| | | |
|---|---|---|
| 6,671,796 B1 | 12/2003 | Sudharsanan et al. |
| 6,715,065 B1 | 3/2004 | Ebata et al. |
| 6,931,639 B1 | 8/2005 | Eickemeyer |
| 7,236,995 B2 | 6/2007 | Hinds |
| 7,242,414 B1 | 7/2007 | Thekkath et al. |
| 7,406,451 B2 | 7/2008 | Mrziglod et al. |
| 7,721,128 B2 | 5/2010 | Johns et al. |
| 7,945,607 B2 | 5/2011 | Hinds |
| 8,051,117 B2 | 11/2011 | Lundvall et al. |
| 8,190,664 B2 | 5/2012 | Lundvall et al. |
| 8,560,591 B2 | 10/2013 | Lundvall et al. |
| 8,694,572 B2 | 4/2014 | Samy et al. |
| 8,762,438 B2 | 6/2014 | Lundvall et al. |
| 8,924,455 B1 | 12/2014 | Barman et al. |
| 9,412,366 B2 | 8/2016 | Wilensky et al. |
| 10,187,568 B1 | 1/2019 | Tran et al. |
| 10,224,954 B1 | 3/2019 | Madduri et al. |
| 10,360,304 B1 | 7/2019 | Alvarez et al. |
| 10,427,306 B1 | 10/2019 | Quinlan et al. |
| 10,656,942 B2 | 5/2020 | Madduri et al. |
| 10,929,744 B2 | 2/2021 | Li et al. |
| 2002/0138714 A1 | 9/2002 | Leibholz et al. |
| 2003/0167460 A1 | 9/2003 | Desai et al. |
| 2005/0138327 A1 | 6/2005 | Tabei |
| 2006/0161375 A1 | 7/2006 | Duberstein et al. |
| 2007/0220076 A1 | 9/2007 | Hinds |
| 2008/0148120 A1 | 6/2008 | Seuring |
| 2009/0113186 A1 | 4/2009 | Kato et al. |
| 2009/0125293 A1 | 5/2009 | Lefurgy et al. |
| 2010/0073068 A1 | 3/2010 | Cho et al. |
| 2010/0191530 A1* | 7/2010 | Nakano .................. G10L 15/32 704/244 |
| 2011/0060587 A1 | 3/2011 | Phillips et al. |
| 2011/0301777 A1 | 12/2011 | Cox et al. |
| 2012/0316845 A1 | 12/2012 | Grey et al. |
| 2013/0054110 A1 | 2/2013 | Sata |
| 2013/0332610 A1 | 12/2013 | Beveridge |
| 2014/0081625 A1 | 3/2014 | Wilensky et al. |
| 2014/0164737 A1 | 6/2014 | Collange et al. |
| 2014/0249814 A1 | 9/2014 | Nakano et al. |
| 2015/0134581 A1 | 5/2015 | Doeding et al. |
| 2015/0370303 A1 | 12/2015 | Krishnaswamy et al. |
| 2016/0026231 A1 | 1/2016 | Ignowski et al. |
| 2016/0054922 A1 | 2/2016 | Awasthi et al. |
| 2016/0124710 A1 | 5/2016 | Lutz et al. |
| 2016/0170710 A1 | 6/2016 | Kim et al. |
| 2016/0170866 A1 | 6/2016 | Ioualalen et al. |
| 2016/0328645 A1 | 11/2016 | Lin et al. |
| 2017/0061279 A1 | 3/2017 | Yang et al. |
| 2017/0076206 A1* | 3/2017 | Lastras-Montano .......................... G06F 16/3344 |
| 2017/0090956 A1 | 3/2017 | Linsky |
| 2017/0103022 A1 | 4/2017 | Kreinin et al. |
| 2017/0142327 A1 | 5/2017 | Bayani |
| 2017/0154450 A1 | 6/2017 | Wang |
| 2017/0161604 A1 | 6/2017 | Craddock et al. |
| 2017/0221176 A1 | 8/2017 | Munteanu et al. |
| 2017/0257079 A1 | 9/2017 | Jain et al. |
| 2017/0262959 A1 | 9/2017 | Lee et al. |
| 2017/0316307 A1 | 11/2017 | Koster et al. |
| 2017/0316312 A1 | 11/2017 | Goyal et al. |
| 2017/0339339 A1 | 11/2017 | De Bayser et al. |
| 2017/0344882 A1 | 11/2017 | Ambrose et al. |
| 2017/0353163 A1 | 12/2017 | Gazneli et al. |
| 2017/0357530 A1 | 12/2017 | Shih et al. |
| 2017/0357910 A1 | 12/2017 | Sommer et al. |
| 2018/0046903 A1 | 2/2018 | Yao et al. |
| 2018/0088996 A1 | 3/2018 | Rossi et al. |
| 2018/0096243 A1 | 4/2018 | Patil et al. |
| 2018/0157464 A1 | 6/2018 | Lutz et al. |
| 2018/0196696 A1* | 7/2018 | Kairali ................ G06F 9/5077 |
| 2018/0270290 A1* | 9/2018 | Sinha .................. H04L 67/2871 |
| 2018/0288440 A1 | 10/2018 | Chao |
| 2018/0293517 A1 | 10/2018 | Browne et al. |
| 2018/0300931 A1 | 10/2018 | Vembu et al. |
| 2018/0322391 A1 | 11/2018 | Wu et al. |
| 2018/0329512 A1* | 11/2018 | Liao .................... G06F 3/167 |
| 2018/0348728 A1* | 12/2018 | Ota ..................... G06F 17/15 |
| 2018/0357541 A1 | 12/2018 | Chen et al. |
| 2018/0367729 A1 | 12/2018 | Parasnis et al. |
| 2018/0373976 A1 | 12/2018 | Woo |
| 2019/0034784 A1 | 1/2019 | Li et al. |
| 2019/0042925 A1 | 2/2019 | Choe et al. |
| 2019/0044860 A1* | 2/2019 | MacNamara ....... H04L 49/3018 |
| 2019/0050710 A1 | 2/2019 | Wang et al. |
| 2019/0057696 A1 | 2/2019 | Ogawa |
| 2019/0114142 A1 | 4/2019 | Yoda et al. |
| 2019/0122094 A1 | 4/2019 | Chen et al. |
| 2019/0122119 A1 | 4/2019 | Husain |
| 2019/0138372 A1 | 5/2019 | Tee |
| 2019/0164285 A1 | 5/2019 | Nye et al. |
| 2019/0180170 A1 | 6/2019 | Huang et al. |
| 2019/0199370 A1 | 6/2019 | Madduri et al. |
| 2019/0205737 A1 | 7/2019 | Bleiweiss et al. |
| 2019/0205746 A1 | 7/2019 | Nurvitadhi et al. |
| 2019/0220734 A1 | 7/2019 | Ferdman et al. |
| 2019/0228762 A1 | 7/2019 | Wang et al. |
| 2019/0251429 A1 | 8/2019 | Du et al. |
| 2019/0265949 A1 | 8/2019 | Ito |
| 2019/0278677 A1 | 9/2019 | Terechko et al. |
| 2019/0294968 A1 | 9/2019 | Vantrease et al. |
| 2019/0339937 A1 | 11/2019 | Lo et al. |
| 2020/0005424 A1 | 1/2020 | Appu et al. |
| 2020/0097799 A1 | 3/2020 | Divakar et al. |
| 2020/0117453 A1 | 4/2020 | Zhang et al. |
| 2020/0117614 A1 | 4/2020 | Zhang et al. |
| 2020/0125508 A1 | 4/2020 | Liu et al. |
| 2020/0126554 A1* | 4/2020 | Chen ..................... G10L 15/32 |
| 2020/0126555 A1* | 4/2020 | Chen ..................... G06F 3/167 |
| 2020/0142748 A1 | 5/2020 | Liu et al. |
| 2020/0159527 A1 | 5/2020 | Zhang et al. |
| 2020/0159530 A1 | 5/2020 | Zhang et al. |
| 2020/0159531 A1 | 5/2020 | Zhang et al. |
| 2020/0159532 A1 | 5/2020 | Zhang et al. |
| 2020/0159533 A1 | 5/2020 | Zhang et al. |
| 2020/0159534 A1 | 5/2020 | Li et al. |
| 2020/0160162 A1 | 5/2020 | Zhang et al. |
| 2020/0160163 A1 | 5/2020 | Liu et al. |
| 2020/0160219 A1 | 5/2020 | Zhang et al. |
| 2020/0160220 A1 | 5/2020 | Zhang et al. |
| 2020/0160221 A1 | 5/2020 | Zhang et al. |
| 2020/0160222 A1 | 5/2020 | Zhang et al. |
| 2020/0168227 A1* | 5/2020 | Chen .................... G10L 15/063 |
| 2020/0174547 A1 | 6/2020 | Fang et al. |
| 2020/0183752 A1 | 6/2020 | Liu et al. |
| 2020/0193160 A1* | 6/2020 | Lee ....................... G06F 40/40 |
| 2020/0241874 A1* | 7/2020 | Chen ................... G06F 9/30025 |
| 2020/0257972 A1 | 8/2020 | Miniskar et al. |
| 2020/0334041 A1 | 10/2020 | Zhang et al. |
| 2020/0334522 A1 | 10/2020 | Zhang et al. |
| 2020/0334572 A1 | 10/2020 | Zhang et al. |
| 2020/0380976 A1* | 12/2020 | Lee ....................... G10L 15/24 |
| 2020/0394522 A1 | 12/2020 | Liu et al. |
| 2020/0394523 A1 | 12/2020 | Liu et al. |
| 2020/0401917 A1* | 12/2020 | Daware ................. G06F 18/214 |
| 2021/0042889 A1 | 2/2021 | Pei |
| 2021/0061028 A1 | 3/2021 | Da Deppo et al. |
| 2021/0065091 A1* | 3/2021 | Bhattacharyya ........................... G06Q 10/06393 |
| 2021/0117768 A1 | 4/2021 | Liu et al. |
| 2021/0117810 A1 | 4/2021 | Liu |

(56) References Cited

U.S. PATENT DOCUMENTS

| | | | |
|---|---|---|---|
| 2021/0182177 A1 | 6/2021 | Su et al. | |
| 2021/0264270 A1 | 8/2021 | Liu et al. | |
| 2021/0334007 A1 | 10/2021 | Liu et al. | |
| 2021/0334137 A1 | 10/2021 | Zhang et al. | |
| 2021/0341989 A1 | 11/2021 | Chen et al. | |
| 2021/0374510 A1 | 12/2021 | Liu et al. | |
| 2021/0374511 A1 | 12/2021 | Liu et al. | |
| 2022/0130540 A1* | 4/2022 | Wang | A61B 5/4088 |

FOREIGN PATENT DOCUMENTS

| | | |
|---|---|---|
| CN | 1851668 A | 10/2006 |
| CN | 101572829 A | 11/2009 |
| CN | 102270042 A | 12/2011 |
| CN | 102404673 A | 4/2012 |
| CN | 102684701 A | 9/2012 |
| CN | 102761509 A | 10/2012 |
| CN | 102789413 A | 11/2012 |
| CN | 102903089 A | 1/2013 |
| CN | 102981854 A | 3/2013 |
| CN | 103152673 A | 6/2013 |
| CN | 104914977 A | 9/2015 |
| CN | 105389158 A | 3/2016 |
| CN | 103534664 A | 8/2016 |
| CN | 105893419 A | 8/2016 |
| CN | 105978611 A | 9/2016 |
| CN | 105979035 A | 9/2016 |
| CN | 106156310 A | 11/2016 |
| CN | 106354568 A | 1/2017 |
| CN | 106406812 A | 2/2017 |
| CN | 106469291 A | 3/2017 |
| CN | 106485316 A | 3/2017 |
| CN | 106502626 A | 3/2017 |
| CN | 106570559 A | 4/2017 |
| CN | 106650922 A | 5/2017 |
| CN | 106814639 A | 6/2017 |
| CN | 106951587 A | 7/2017 |
| CN | 106951962 A1 | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107451658 A | 12/2017 |
| CN | 107608715 A | 1/2018 |
| CN | 107610042 A | 1/2018 |
| CN | 107644254 A | 1/2018 |
| CN | 107688855 A | 2/2018 |
| CN | 107797913 A | 3/2018 |
| CN | 107832843 A | 3/2018 |
| CN | 107832844 A | 3/2018 |
| CN | 108053028 A | 5/2018 |
| CN | 104899641 A | 7/2018 |
| CN | 108337000 A | 7/2018 |
| CN | 108388446 A | 8/2018 |
| CN | 108510067 A | 9/2018 |
| CN | 108717570 A | 10/2018 |
| CN | 109062540 A | 12/2018 |
| CN | 109063820 A | 12/2018 |
| CN | 109902745 A | 6/2019 |
| CN | 109934331 A | 6/2019 |
| CN | 109993296 A | 7/2019 |
| CN | 110059733 A | 7/2019 |
| CN | 11055450 A | 12/2019 |
| CN | 110780845 A | 2/2020 |
| EP | 0 789 296 A1 | 8/1997 |
| EP | 2 703 945 A2 | 3/2014 |
| EP | 3001333 A1 | 3/2016 |
| EP | 3 106 997 A2 | 12/2016 |
| EP | 3 407 268 A1 | 11/2018 |
| JP | H03-075860 A | 8/1989 |
| JP | H09-265379 A | 10/1997 |
| JP | 2009-134433 A | 8/2012 |
| JP | 2013-514570 A | 4/2013 |
| JP | 2014-199464 A | 10/2014 |
| JP | 2013514570 A | 4/2015 |
| JP | 2015-176158 A | 10/2015 |
| JP | 2018-26114 A | 2/2018 |
| JP | 2019-519852 A | 7/2019 |
| WO | 2008153194 A1 | 12/2008 |
| WO | 2014199464 A1 | 12/2014 |
| WO | 2016049439 A1 | 3/2016 |
| WO | 2016186823 A1 | 11/2016 |
| WO | 2017138220 A1 | 8/2017 |
| WO | 2017185412 A1 | 11/2017 |

OTHER PUBLICATIONS

Rapita Systems, "Explaining the difference between Execution Times and Response Times," Sep. 16, 2010, https://www.rapitasystems.com/blog/explaining-difference-between-execution-times-and-response-times.*

Cooper et al., "Redundancy Elimination Revisited," PACT'08, Oct. 25-29, 2008, Toronto, Ontario, Canada, https://dl.acm.org/doi/10.1145/1454115.1454120.*

Chen, T., et al., "DianNao: A Small-Footprint High-Throughput Accelerator for Ubiquitous Machine-Learning," ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.

Chen, T., et al., "A Small-Footprint Accelerator for Large-Scale Neural Networks," ACM Transactions on Computer Systems (TOCS), vol. 33, Issue 2, May 1, 2015, Article No. 6, ACM New York, NY, USA; available: https://dl.acm.org/citation.cfm?id=2701417.

Chen, Y., et al., "DaDianNao: A Machine-Learning Supercomputer," MICRO-47 Proceedings of the 47th Annual IEEE/ACM International Symposium on Microarchitecture, pp. 609-622, Cambridge, United Kingdom—Dec. 13, 2014; available: https://dl.acm.org/citation.cfm?id=2742217.

Luo, T., et al., "DaDianNao: A Neural Network Supercomputer," Published in: IEEE Transactions on Computers, vol. 66, Issue: 1, pp. 73-88, Date of Publication: May 30, 2016; available: https://ieeexplore.ieee.org/document/7480791.

Liu, D., et al., "PuDianNao: A Polyvalent Machine Learning Accelerator," ASPLOS '15 Proceedings of the Twentieth International Conference on Architectural Support for Programming Languages and Operating Systems,pp. 369-381, Istanbul, Turkey—Mar. 14, 2015; available: https://dl.acm.org/citation.cfm?id=2694358.

Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015; available: https://dl.acm.org/citation.cfm?id=2750389.

Du, Z., et al., "An Accelerator for High Efficient Vision Processing," Published in: IEEE Transactions on Computer-Aided Design of Integrated Circuits and Systems, vol. 36, Issue: 2, Jun. 22, 2016, pp. 227-240; available: https://ieeexplore.ieee.org/document/7497562.

Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; available: https://ieeexplore.ieee.org/document/7551409.

Zhang, S. et al., "Cambricon-X: An Accelerator for Sparse Neural Networks," Published in: 2016 49th Annual IEEE/ACM International Symposium on Microarchitecture (MICRO), Taipei, Taiwan, Oct. 15, 2016; available: https://ieeexplore.ieee.org/document/7783723.

Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.

A Framework for Algorithm Deployment on Cloud-based Quantum Computers; arxiv.org, Cornell University Library, 201 Olin Library Cornell University Ithaca, NY 14853, Dated Oct. 24, 2018; pp. 1-10.

European Search Report dated May 27, 2022, corresponding to European Application No. 18920196.5; 11 pages.

(56) References Cited

OTHER PUBLICATIONS

Vivienne Sze et al., "Efficient Processing of Deep Neural Networks: A Tutorial and Survey", arxiv.org, Cornell University Library, 201 Olin Library Cornell University Ithaca, NY 14853, Mar. 27, 2017 (Mar. 27, 2017), XP080759895, DOI: 10.1109/JPROC.2017.2761740.

Liu Shaoli et al., "Cambricon: An Instruction Set Architecture for Neural Networks", 2013 21st International Conference on Program Comprehension (ICPC); [International Symposium on Computer Architecture.(ISCA)], IEEE, US, Jun. 18, 2016 (Jun. 18, 2016), pp. 393-405, XP032950675, ISSN: 1063-6897, DOI: 10.1109/ISCA.2016.42 ISBN: 978-0-7695-3174-8 [retrieved on Aug. 24, 2016].

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://math-atlas.sourceforge.net/devel/assembly/ vector_simd_pem. ppc. 2005AUG23.pdf [retrieved on Mar. 3, 2020].

Sumod Mohan, "Accuracy and Multi-Core Performance of Machine Learning Algorithms for Handwritten Character Recognition", Aug. 1, 2009 (Aug. 1, 2009), XP055673941, Retrieved from the Internet: URL:https://tigerprints.clemson.edu/cgi/viewcontent.cgi? article=1634&context=all theses retrieved on Mar. 5, 2020].

European Patent Office, Extended European Search Report for European Application No. 19212749.6 dated Mar. 18, 2020.
European Patent Office, Extended European Search Report for European Application No. 19212750.4 dated Mar. 18, 2020.
European Patent Office, Extended European Search Report for European Application No. 19212751.2 dated Mar. 18, 2020.
European Patent Office, Extended European Search Report for European Application No. 19212752.0 dated Mar. 18, 2020.
European Patent Office, Extended European Search Report for European Application No. 19214004.4 dated Mar. 18, 2020.
European Patent Office, Extended European Search Report for European Application No. 19213389.0 dated Mar. 18, 2020.
European Patent Office, Extended European Search Report for European Application No. 19212753.8 dated Mar. 18, 2020.
European Patent Office, Extended European Search Report for European Application No. 19212754.6 dated Mar. 18, 2020.
European Patent Office, Extended European Search Report for European Application No. 19212755.3 dated Mar. 18, 2020.
European Patent Office, Extended European Search Report for European Application No. 19212756.1 dated Mar. 18, 2020.
European Patent Office, Extended European Search Report for European Application No. 18906652.6 dated Mar. 18, 2020.
European Patent Office, Extended European Search Report for European Application No. 19212746.2 dated Mar. 18, 2020.

Kalathingal Sajith et al., "Dynamic Inter-Thread Vectorization Architecture: Extracting OLP from TLP", 2016 28th International Symposium on Computer Architecture and High Performance Computing (SBAC- PAD), IEEE, Oct. 26, 2016, pp. 18-25, XP033028005, DOI: 10.1109/SBAC-PAD.2016.11.

Li et al., "Using Artificial Neural Network for Predicting Thread Partitioning in Speculative Multithreading", IEEE, 2015, pp. 823-826.

Na et al., "Speeding up Convolutional Neural Network Training with Dynamic Precision Scaling and Flexible MiultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.

Anonymous, "Control unit—Wikipedia", May 8, 2017 (May 8, 2017), XP055673879,Retrieved from the Internet: URL: https://web.archive org/web/20170508110348/https://en.wikipedia.org/ wiki/ Control unit [retrieved on Mar. 5, 2020].

Joel Emer et al., "DNN Accelerator Architectures", CICS/MTL Tutorial, Jan. 1, 2017 (Jan. 1, 2017), XP055672691, Retrieved from the Internet: URL:https://www.rle.mit.edu/eems/wp-content/uploads/2017/031Tutorial-on- JNN-4-of-5-DNN-Accelerator-Architectures.pdf [retrieved on Mar. 2, 2020].

Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].

Pedro O. Domingos, et al., "An Efficient and Scalable Architecture for Neural Networks With Backpropagation Learning'" Proceedings/ 2005 International Conference on Field Programmable Logic and Applications {FPL): Tampere Hall, Tampere, Finland, Jan. 1, 2005, pp. 89-94, XP055606447, Piscataway, NJ. DOI: 10.1109/FPL.2005.1515704 ISBN: 978-0-7803-9362-2.

Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].

Song Mingcong et al., "In-Situ AI: Towards Autonomous and Incremental Deep Learning for IoT Systems", 2018 IEEE International Symposium on High Performance Computer Architecture (HPCA),IEEE, Feb. 24, 2018 (Feb. 24, 2018), pp. 92-103, XP033341941, DOI: 10.1109/HPCA.2018.00018 [retrieved on Mar. 27, 2018].

Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE.2018.844167 4 [retrieved on Aug. 20, 2018].

Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].

European Patent Office, extended European search report for Application No. 19216754.2 dated May 8, 2020.
Extended European Search Report for EP Application No. 19214324.6 dated Oct. 1, 2020.
International Searching Authority, International Search Report for PCT Application No. PCT/CN2019/093144 dated Oct. 9, 2019.
Extended European Search Report for Application No. 19215861.6 dated May 15, 2020.
Extended European Search Report for Application No. 19215862.4 dated May 15, 2020.

Sumina Yamashita, et al., "A Method to create illustrate images using DCGAN," JISJ SIG Technical Report, vol. 2017-MPS-112 No. 16, Feb. 27, 2017; translation of abstract included.

\* cited by examiner

|  | Input | Output |
|---|---|---|
| The first time | FIG. 1, FIG. 2 | FIG. 1+FIG. 2 |
| The second time | FIG. 3, FIG. 4A | FIG. 3+FIG. 4A |
| The third time | FIG. 4B, FIG. 4C | FIG. 4B+FIG. 4C |
| The fourth time | FIG.1+FIG. 2, FIG. 3+FIG. 4A | FIG. 1+FIG. 2+FIG. 3+FIG. 4A |
| The fifth time | FIG. 4B+FIG. 4C, FIG. 1+FIG. 2+FIG 3+FIG. 4A | FIG. 1+FIG. 2+FIG. 3+FIG. 4A FIG. 4B+FIG. 4C |

Fig. 4B

|  | Input | Output |
|---|---|---|
| The first time | FIG. 1, FIG. 2 | FIG. 1+FIG. 2 |
| The second time | FIG. 3, FIG. 1+FIG. 2 | FIG. 1+FIG. 2+FIG. 3 |
| The third time | FIG. 4A, FIG. 1+FIG. 2+FIG. 3 | FIG. 1+FIG. 2+FIG. 3 +FIG. 4A |
| The fourth time | FIG. 4B, FIG. 1+FIG. 2+FIG. 3+FIG. 4A | FIG. 1+FIG. 2+FIG. 3+FIG. 4A+FIG. 4B |
| The fifth time | FIG. 4C, FIG. 1+FIG. 2+FIG. 3+FIG. 4A+FIG. 4B | FIG. 1+FIG. 2+FIG. 3+FIG. 4A+FIG. 4B+FIG. 4C |

Fig. 4C

SIGNAL PROCESSING DEVICE AND RELATED PRODUCTS

RELATED APPLICATIONS

This application is a national stage application of PCT/CN2018/112528, filed Oct. 30, 2018, which claims the benefit of priority from Chinese Application No. 201811145439.8, filed Sep. 28, 2018, and Chinese Application No. 201811152999.6, filed Sep. 28, 2018, and Chinese Application No. 201811145756.X, filed Sep. 28, 2018, the disclosures of which are incorporated herein by reference in their entirety.

TECHNICAL FIELD

The present disclosure relates to the field of image processing, and particularly relates to a signal processing device, a signal processing method, and related products.

BACKGROUND

With popularization of electronic devices (such as mobile phones, tablet computers, servers, and other computer devices), electronic devices can support more applications with more powerful functions. Electronic devices are developing in a diversified and personalized trend, and have become indispensable electronic products in users' lives.

At present, voice recognition and image recognition are common technical means of electronic devices. However, current electronic devices cannot precisely recognize true intentions of users yet, which may bring operational inconveniences to users in the actual application process.

SUMMARY

Examples of the present disclosure provide a signal processing device, a signal processing method, and related products, which may realize a function of inputting a signal to process images. Therefore, true intentions of users may be precisely recognized to bring operational conveniences to users.

In a first aspect, examples of the present disclosure provide a signal processing device, including:
a signal collector configured to collect a signal input by a user;
an instruction converter configured to convert the signal into a processing instruction and target data according to a target signal instruction conversion model, where the target data is data to be processed; and
a processor configured to process the target data according to the processing instruction and a target processing model to process the target data.

In a second aspect, examples of the present disclosure further provide a machine learning operation device which includes one or more signal processing devices of the first aspect. The machine learning operation device is configured to obtain input data to be operated and control information from other processing devices, execute a specified machine learning operation, and send an execution result to other processing devices through I/O interfaces;
when the machine learning operation device includes a plurality of the signal processing devices, the plurality of the signal processing devices are connected and transfer data through a specific structure; and
the plurality of the signal processing devices are interconnected and transfer data through a peripheral component interconnect express (PCIE) bus to support larger-scale machine learning operations. The plurality of the signal processing devices share a same control system or have respective control systems; share a memory or have respective memories; and are interconnected in a manner of arbitrary interconnection topology.

In a third aspect, examples of the present disclosure provide a combined processing device, where the combined processing device includes the machine learning operation device of the second aspect, a universal interconnection interface, and other processing devices; and
the machine learning operation device interacts with the other processing devices to jointly complete a computing operation specified by users.

In a fourth aspect, examples of the present disclosure further provide a neural network chip which includes the machine learning operation device of the second aspect or the combined processing device of the third aspect.

In a fifth aspect, examples of the present disclosure provide an electronic device which includes the chip of the fourth aspect.

In a sixth aspect, examples of the present disclosure provide a board card which includes: a storage device, an interface device, a control device, and the neural network chip of the sixth aspect;
where the neural network chip is connected to the storage device, the control device, and the interface device respectively;
the storage device is configured to store data;
the interface device is configured to transfer data between the chip and an external device; and
the control device is configured to monitor a state of the chip.

In a seventh aspect, examples of the present disclosure provide a signal processing method, including:
collecting a signal input by a user;
converting the signal into a processing instruction and target data according to a target signal instruction conversion model, where the target data is processing data of data to be processed; and
processing the target data according to the processing instruction and a target processing model to process the target data.

In an eighth aspect, examples of the present disclosure provide a computer readable storage medium, on which a computer program for electronic data exchange is stored. The computer program enables a computer to execute some or all of the steps described in the seventh aspect of the present disclosure.

In a ninth aspect, examples of the present disclosure provide a computer program product, which includes a non-volatile computer readable storage medium storing a computer program. The computer program enables a computer to execute some or all of the steps described in the seventh aspect of the present disclosure. The computer program product may be a software installation package.

It can be seen that, in the solution of examples of the present disclosure, the signal collector collects a signal input by a user. The instruction converter converts the signal into a processing instruction and target data according to a target signal instruction conversion model, where the target data is processing data of data to be processed. The processor processes the target data according to the processing instruction and a target processing model to process the target data. Compared with existing image processing technologies, the present disclosure performs image processing through a signal, which may precisely recognize true intentions of users and bring operational conveniences to users.

The above aspects or other aspects of the present disclosure will be more concise and easier to understand in descriptions of following examples.

BRIEF DESCRIPTION OF THE DRAWINGS

To describe technical solutions in examples of the present disclosure more clearly, accompanied drawings needed in the examples of the present disclosure will be briefly described hereinafter. Apparently, the described accompanied drawings below are some examples of the present disclosure. Those of ordinary skill in the art may obtain other accompanied drawings based on the accompanied drawings without creative efforts.

FIG. 4B is a schematic diagram of a signal processing according to one example of the present disclosure;

FIG. 4C is a schematic diagram of another signal processing according to one example of the present disclosure;

DETAILED DESCRIPTION OF EXAMPLES

Technical solutions in the examples will be described in detail hereinafter

The terms such as "first", "second", "third", "fourth" and the like configured in the specification, the claims, and the accompanied drawings of the present disclosure are configured for distinguishing between different objects rather than describing a particular order. The terms "include" and "comprise" as well as variations thereof are intended to cover non-exclusive inclusion. For instance, a process or a method including a series of steps or a system, a product, a device, or an device including a series of units is not limited to the listed steps or units, it may alternatively include other steps or units that are not listed; Optionally, other steps or units inherent to the process, method, product, or device may be included.

The term "example" referred to herein means that a particular feature, structure, or characteristic described in conjunction with the example may be contained in at least one example of the present disclosure. The phrase appearing in various places in the specification does not necessarily refer to the same example, nor does it refer to an independent or alternative example that is mutually exclusive with other examples. It is expressly and implicitly understood by those skilled in the art that an example described herein may be combined with other examples.

Figure 1:
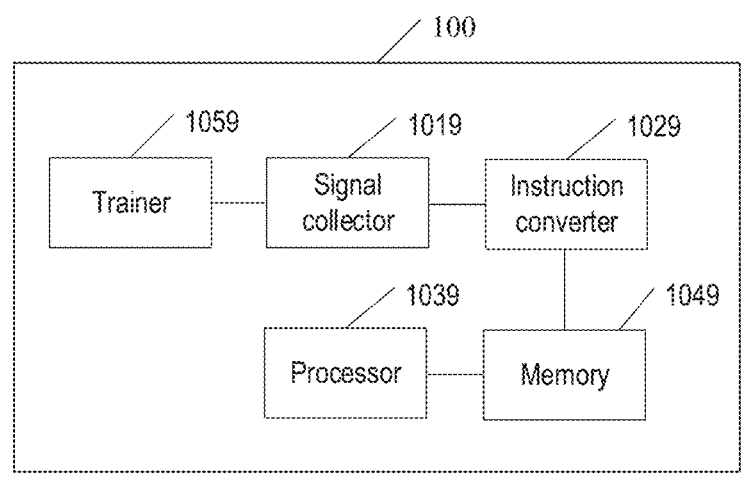
FIG. 1 is a structural diagram of a signal processing device according to an example of the present disclosure.

FIG. 1 is a structural diagram of a signal processing device according to an example of the present disclosure. As shown in FIG. 1, a signal processing device 100 includes:

a signal collector 1019 configured to collect a signal input by a user, where the signal includes, but is not limited to, a voice signal, an image signal, a text signal, and a sensor signal. The signal collector may collect only one or more of the signals.

Optionally, the signal processing device 100 may further include a signal filter. After the signal collector 101 collects the signal, the signal filter performs noise reduction processing on the input signal to reduce interference of useless data in the signal.

Optionally, the signal collector may be a voice signal collector, including but not limited to: a voice sensor, a microphone, a pickup, or other video collectors, which is not limited herein. The signal collector may also be an image collector, including but not limited to: a camera, a video camera, and other image collectors, which is not limited herein. The signal collector may also be a sensor signal collector, including but not limited to: a touch screen, a touchpad, a body sensor, an ultrasound sensor, a brain wave sensor, and other sensor signal collectors.

Specifically, if the signal in the step 101 is a voice signal, the signal collector 1019 may receive an environmental sound signal when receiving a voice signal. The signal filter performs noise reduction processing on the voice signal according to the environmental sound signal. For the voice signal, the environmental sound signal is noise. Furthermore, the signal collector 101 may include a microphone array configured to collect the voice signal and the environmental voice signal, and reduce noise.

Specifically, if the signal in the step 101 is an image signal, the signal collector 1019 may receive an image signal, where only part content of the image signal is valid information such as a gesture, a facial expression, and an action trend. The signal filter may be configured to filter out useless information and only extract useful information in the image, such as a gesture, a facial expression, and an action trend. Further, the image collector 101 may include a somatosensory sensor configured to, after an image is collected, extract a somatosensory action and an orientation of a person to locate and obtain useful information.

Specifically, if the signal in the step 101 is a text signal, the signal collector 1019 may receive a text signal, where not all content of the text signal is valid information. The text signal filter may be configured to filter out useless information and extract useful information of the text signal, such as keywords.

Optionally, in an example, the signal processing device may further include a first storage module. After the signal collector collects the signal, the signal processing device stores the signal into the first storage module.

The instruction converter 1029 is configured to convert the signal into a processing instruction and target data according to a target signal instruction conversion model, where the target data is processing data of data to be processed.

The processing instruction may be configured to achieve following functions: data modification, data editing, data integration, data splicing, data deletion, etc., and the functions are not limited herein. The processing instruction may include at least one of the followings: an image processing instruction, a voice processing instruction, a text processing instruction, etc., which is not limited herein. For instance, an image processing instruction may be configured to achieve following functions: changing a color, brightness, contrast, and the like of a partial or an entire image, replacing partial content of an image with other content, enlarging or reducing part or all of content of an image, editing part or all of content of an image for bokeh or mosaicing, stitching multiple images, integrating multiple images, deleting part of content of an image, etc. The functions are not limited herein. As another example, a voice processing instruction may be configured to achieve following functions: changing part or all of loudness, frequency, and timbre of the voice data, replacing part of the voice data with other content, modifying part or all of voice data, replacing part of content of voice data with other content, modifying part or all of voice content, deleting part of voice data and splicing remaining content, and integrating multiple pieces of voice data, etc., which are not limited herein. A text processing instruction may be configured to achieve following functions: deleting a text file, editing a text file, creating a folder, file encryption/decryption, file transfer, file compression, etc., which are not limited herein. In the examples of the present disclosure, the data may include at least one of the following: text data, voice data, image data, which is not limited herein.

In an example, the processing instruction may be defined as three types of processing instructions including a logical processing instruction, a precise processing instruction, a misty processing instruction. Other processing instructions may also be included. The processing instruction may include at least an operation type and an operation area. The processing instruction may further include operation data. The operation type may include at least one of the followings: image recognition, image segmentation, image enhancement, image restoration, image noise reduction, background bokeh, image stitching, image integration, voice recognition, voice synthesis, voice noise reduction, voice separation, text screenshot, text editing, etc. The operation type is not limited herein.

The logical processing instruction may be configured to process an operation requirement with a given logical meaning. For instance, in a logical processing instruction for image such as removing a football in an image, the operation of removing the football includes detecting and positioning a football area in the image, deleting the football area, and fusing the area with content around the area. The logical processing instruction may include an operation type, a logical operation area, and logical operation data.

The precise processing instruction may be configured to process an operation requirement with given precise data such as a coordinate range. For instance, in a precise processing instruction for image, in a circular area with a center point of the image as an origin and a radius as 10 pixels, a color with a RGB value as 255, 0, and 0 respectively in this area is changed. The precise processing instruction may include an operation type, a precise operation area, and precise operation data.

The misty processing instruction may be configured to process an operation requirement with given misty data, such as performing an operation on an area "near a center point". The misty processing instruction may include an operation type, a misty operation area, and misty operation data.

Other processing instructions may include related operation instructions such as data input and output, data determination, etc.

The above operation types may be in the form of encoding, which is defined by a certain encoding method such as a sequential encoding method. An operation type includes, but is not limited to, movement, deletion, replacement, parameter change (such as discoloration, brightness, and contrast), shape change (reduction, enlargement, and deformation), etc. Specifically, the operation type may include changing the color, the brightness, the contrast, and the like of an operation area, deleting content of the operation area, replacing the content of the operation area with other content, enlarging/reducing/spinning the content of the operation area, performing bokeh/atomization/mosaicing on the content of the operation area, synthesizing the operation area, stitching operation area, modeling operation area, etc. The operation type is not limited herein.

The operation area may be an entire image or a partial area in the image. According to a given manner, the operation area may include the logical area, the precise area, the misty area, or other areas. The logical area may refer to an area with a certain logical meaning, which may include a specified item (such as a football, a desk, a puppy, etc.), a specified background (such as sea, a mountain, etc.), a specified part (such as a human face, a skeleton structure, a wing of a bird, etc.), and the like. The logical areas are obtained through offline training of algorithms such as machine learning, and can be customized for users in a manner of online training. The precise area may refer to an area with precise positioning including precise coordinates and ranges, and precise requirements and ranges, such as a circular area with a center point of an image as an origin and a radius as 10 pixels, and positions of all colors with a RGB value as (255, 0, 0) in the image, etc. The misty area may refer to an area with a given direction but a slightly misty positioning and range, such as an upper left corner of the image, a red area, etc. In terms of the positioning and determination of the part of content, a range to be processed may be intelligently selected through a selection model obtained by offline training of a machine learning algorithm according to features of the image to be processed.

Optionally, the operation instruction may further include operation data which includes logic operation data, precise operation data, and misty operation data. The logical operation data may refer to data with a certain logical meaning, which may include a specified item (such as a football, a desk, a puppy, etc.), a specified background (such as sea, a mountain, etc.), a specified part (such as a human face, a skeleton structure, a wing of a bird, etc.), and the like. The precise data may include precise numerical parameters or precise addresses pointing to the data. For instance, in a logical instruction type, the logical instruction is changing a human face for a football, the operation type is replacement, the operation area is the face area, and the operation data is the football (or an address pointing to the football in the image). The misty data may include misty descriptions, such as "darker" color, "lower" brightness, and the like.

For instance, a process of inputting a single image and outputting a single image includes that: a signal collector receives a voice signal, performs preprocessing on the voice signal to remove invalid information such as noise, etc., sends a preprocessed voice signal to an instruction conversion unit, parses the voice signal through a voice recognition technology, and converts the voice signal into a predefined image processing instruction; an image processing unit receives an image processing instruction, locates and divides an image to be processed through an image recognition technology according to the instruction to obtain a target area of the image to be processed. If operation data is required, the operation data is read from a storage unit and then sent to the image processing unit. The image processing unit performs a given operation on the target area of the image to be processed by using the operation data according to a processing instruction, and an image is output when the operation is completed.

As an example of the above processing, the input data to be processed is an image of a person standing. An input processing requirement is a voice signal (changing a background and standing by the sea). A portrait image is received as data to be processed, and then sent to a processor for processing. The signal processor 1019 receives the voice signal through a microphone array and performs noise reduction processing to obtain a valid voice requirement (changing the background and standing by the sea). The instruction converter 1029 converts the received voice signal into text information by using a voice recognition technology, converts the text information into a processing instruction and a target area (target data) by using a natural language processing technology, indicates that an operation to be processed is replacement and the target area is the "person" in the image to be processed as well as the "background" of a seaside image in an image library, and then transfers parsed content to the memory 1049 for temporary storage. The processor 1039 extracts data to be processed and the target area parsed by the processing instruction from the storage module, divides the image to be processed into areas by using the image processing technology to obtain a corresponding target area, and stores the corresponding target area in the memory 1049; searches and selects required known data (the background image of seaside) from the memory 1049, divides the known data into areas by using the image processing technology to obtain a corresponding target area of the known data, and stores the corresponding target area of the known data in the memory 1049; obtains the target area of the data to be processed and the target area of the known data from the memory 1049 for intelligent integration (intelligent integration refers to appropriately scaling the portrait according to the background), appropriately changes a posture and an expression of the portrait according to a preset environment (a solemn and serious posture as well as an expression are required), integrates the changed posture and expression into the background image, and performs operations such as edge softening or adding character shadow according to sunlight to obtain a processed image. If an ending massage sent from a user is received, the processing ends and then the data can be output; otherwise, the user's processing requirement continues to be received until the ending message sent from the user is received. A form of the ending message may be a voice form, an image form, or a form in which the user obtains information by clicking an end button, which is not limited herein. For instance, if the user is dissatisfied with the posture and wants to change to a person's posture in another image, the user can input a new image as a reference image and input a voice requirement. The signal collector 1019 collects the voice requirement and sends the voice requirement to the processor 1039 for parsing. A target area of the reference image and a portrait posture in the reference image can be obtained according to a parsed result. In order to check whether the user's requirement is reasonable, for instance, an unreasonable situation may be the portrait posture in the reference image is not suitable to be placed in front of the seaside, the processor 1039 actively sends a confirmation message to the user to ask whether the user is sure to perform the operation. If it is detected that no unreasonable situation exists or the user confirms to perform the operation, the portrait posture in the original processed image can be edited according to the portrait posture in the reference image, and then operations such as boundary softening can be performed to obtain a new processed image. In this process, the user's requirements can be combined with a plurality of input forms. For instance, when the user wants to move a position of the person, the person as a whole can be selected as a target area through a voice requirement, and then the user's gesture is obtained through a camera to move the person around. Similarly, until an end message sent from the user is received, the processing ends.

Optionally, before the instruction converter 1029 converts the signal into a processing instruction and target data according to a voice recognition technology, a natural language processing technology, an image recognition technology, etc., the instruction converter 1029 obtains the signal in the step 101 from the first storage module.

Figure 2:
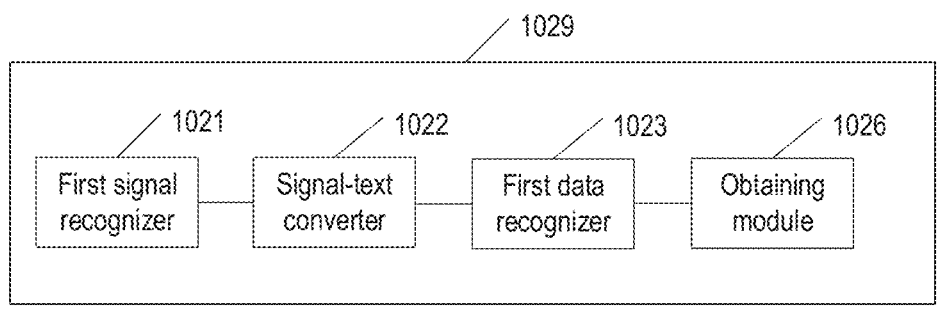
FIG. 2 is a partial structural diagram of another signal processing device according to one example of the present disclosure.

As shown in FIG. 2, the instruction converter 1029 includes:

a first signal recognizer 1021 configured to convert the signal into text information. Optionally, the recognizer may include one or more sub-recognizers, for instance, a voice signal sub-recognizer converts a voice signal into text information according to a voice recognition technology, and an image signal sub-recognizer converts a valid signal of an image or a group of images into text information through the image recognition technology, etc.

Optionally, during the process of converting the signal into text information, multiple types of signals may be processed at the same time. For instance, a voice signal and an image signal are input at the same time, then a voice signal sub-recognizer and an image signal sub-recognizer are respectively used to recognize the voice signal and the image signal.

An image recognition technology refers to a technology for recognition and analysis of an input image signal. The image recognition technology includes, but is not limited to, using an OTSU algorithm, a Roberts operator, a Sobel operator, a Normalized Cuts algorithm for image segmentation; using a Bag of words (BoW) method, a Partsand structure method, a generative and discriminative method, and the like for target recognition and target detection; and using a kernelized correlation filter (KCF) algorithm, a Discriminative Scale Space Tracker (DSST) algorithm, and the like for target tracking; and extracting an operation expressed by an image signal from an image or a group of images:

Procedures of the image signal processing a group of images are described as follows. For instance, a camera is used to collect multiple images, and an image signal sub-recognizer is used to segment a collected image and remove invalid information, which means to segment a foreground and a background of the image and remove the background information as well as obtain the foreground information, then relevant information such as a position and a size of one or more targets can be determined. Specifically, if using an edge detection and segmentation technology such as an edge detection algorithms including a sobel edge detection algorithm, a laplace edge detection algorithm, etc., and a segmentation algorithm including an image segmentation algorithm based on a threshold, an image segmentation algorithm based on an edge, an edge segmentation algorithm based on an area, an edge segmentation algorithm based on graph theory, a segmentation algorithm based on energy functional, a segmentation algorithm based on wavelet transform, and a segmentation algorithm based on a neural network, the position and the range of a human face, a human hand, and a human skeleton structure may be determined. Then the target is recognized and features of the target are extracted. A feature extraction technology may include corner detection such as SIFT, SURF, and HARRIS fast. If there are multiple alternative targets, an alternative priority of each alternative target is determined. Finally, a valid target is selected and a target tracking technology such as a correlation filter and a deep learning method (not limited herein) is used to track the target's motion trail to obtain a meaning expressed by the target. For instance, if the face and the skeleton structure of a person are basically unchanged while the human hand slides from left to right, the obtained valid information is to move target data of the image to be processed from left to right, and then the valid image information is converted into text information.

Procedures of the text signal processing a piece of text are described as follows. For instance, a text information collector is used to obtain a piece of text information, and a text signal sub-recognizer is used to segment collected text to form a text vector, and then a text feature extraction technology is used to select valid text information. The text feature extraction technology may include at least one of the following: TF-IDF, a word frequency method, a document frequency method, mutual information, expected cross entropy, secondary information entropy, a ×2 statistics method, a text evidence right, a genetic algorithm, a principal component analyzing method, a simulated annealing algorithm, an N-Gram algorithm, etc., which is not limited herein. Combined with a text matching model generated through offline training, valid collected text information is converted into text information that can be sent to the signal text converter.

Processing procedures of the multiple signals are described as follows. For instance, if two or more signal collectors collect signals, assuming a voice signal and an image signal, the voice signal is processed by a voice signal sub-recognizer to be text information corresponding to the voice signal, and the image signal is processed by an image signal sub-recognizer to be a preset type of information corresponding to the image signal. The preset type of information may be at least one of the following: text information, image information, voice information, projection information, vibration information, etc., which is not limited herein.

A signal text converter 1022 is configured to convert the one or more pieces of text information into the processing instruction through the natural language processing technology and the target signal instruction conversion model.

A first image recognizer 1023 is configured to divide the data to be processed into areas according to a granularity of a semantic area in the processing instruction and the image recognition technology, and obtain the target data.

Further, the instruction converter 1029 may further include:

an obtaining module 1026 configured to obtain the granularity of the semantic area in the processing instruction.

The semantic area is described as follows. For instance, if the signal processing device 100 determines that the target data is a human face area according to a voice signal, the semantic area is the human face area in the data to be processed, and the face is used as a granularity by the signal processing device to obtain multiple human face areas in the data to be processed. If the target data is a background, the signal processing device divides the data to be processed into a background area and a non-background area. If the target data is a red color area, the signal processing device divides the data to be processed into areas of different colors according to colors.

Optionally, the instruction converter 1029 may further include an interactive module configured to perform an interactive operation between a system and a user. The interactive module may be configured to send interactive information to the user, receive the user's feedback information, and generate a corresponding instruction based on the feedback information, and send the instruction to the processor 1039 to perform a corresponding operation. The interactive information may be instruction information for prompting the user to execute a specified operation. The specified operation may be set by the user or defaulted by the system, and the feedback information may be input by the user. An input method may include, but is not limited to, a voice input, a touch input, an action input, etc., which is not limited herein. For instance, the interactive module may be used by the user to determine whether the target data and the processing instruction meet a preset requirement of a determination model. The preset requirement may be set by the user or defaulted by the system. For instance, a requirement for head-to-foot swap does not make sense. If the target data and the processing instruction do not satisfy a preset requirement of the determination model, prompt information is returned to the user, such as asking whether the user confirms to execute the operation. The determination model may be a model obtained through offline training, or be a user-defined model. If confirmation information is received, the execution continues. The method for user confirmation may include at least one of the following: clicking a button, voice input, image input, etc., which is not limited herein. Furthermore, the interactive module may be further configured to scale one and/or several local areas of the image to be processed in sequence according to a preset order or the user's habit, so as to facilitate more detailed operations. Specifically, if the user is used to adjusting the order of eyebrows, eyes, and a mouth in sequence when modifying a portrait image, the device may enlarge the eyebrows, the eyes, and the mouth in sequence when detecting that the image to be processed is a portrait image, so as to facilitate the user to operate the image.

Specifically, the voice recognition technology used in the present disclosure may include, but is not limited to, an artificial neural network (ANN), a Hidden Markov Model (HMM), and other models. The voice signal sub-recognizer in the first voice recognition unit is capable of processing the voice signal according to the voice recognition technology.

The natural language processing technology may include, but not is limited to, a statistical machine learning, ANN, and other methods, and the semantic understanding unit is capable of extracting semantic information according to the natural language processing technology. The image recognition technology may include, but is not limited to, an edge-detection-based algorithm, a threshold segmentation algorithm, an area growing and watershed algorithm, a grayscale integral projection curve analysis algorithm, a template matching algorithm, a deformable template algorithm, a Hough transform algorithm, a Snake operator algorithm, an elastic image matching technology based on Gabor wavelet transform, an active shape model, an active appearance model, and the like. The image recognition unit is capable of segmenting the data to be processed into different areas according to the image recognition technology.

The natural language processing technology enables a computer to understand an input voice or text information. The natural language processing technology includes, but is not limited to a maximum matching algorithm, a word2vec algorithm, a doc2vec algorithm, a potential voice index algorithm, a potential Dirichlet distribution algorithm, and a machine learning algorithm which includes a support vector machine algorithm, a neural network algorithm, an AdaBoost algorithm, and other algorithms. The natural language processing technology is used to perform lexical analysis, grammatical analysis, semantic analysis, emotional tendency analysis, etc. to obtain views and meanings expressed in the input signal, such as performing data noise reduction after reading signal data, then segmenting and labeling the data, and establishing a bag-of-words model by using a TF-IDF algorithm, a word2vec algorithm, and other algorithms. A feature is selected by using WllR (Weighted Log Likelihood Ration), WFO (Weighted Frequency and Odds), and other algorithms. According to an obtained feature of the input signal, the input signal may be converted into corresponding text information, or the corresponding text information may be obtained through a model generated according to the feature through pre-training. For instance, the semantic understanding technology refers to analyzing the semantic of the input signal by using a semantic tree, a topic model, a word vector, and other technologies to obtain a topic and an operation expressed by the input signal, so as to facilitate subsequent selection of appropriate models for processing.

As an example of the above processing, the input data to be processed is a segment of voice, reference data is a segment of text, and an input processing requirement is a segment of voice (requiring the text to be read out and inserted into the voice to be processed). The signal collector 1019 receives a segment of voice and performs preprocessing such as noise reduction on the segment of voice, then the preprocessed segment of voice is sent to the memory 1049 as data to be processed for temporary storage. The signal collector 1019 receives a voice signal through a microphone array and performs noise reduction processing on the voice signal to obtain a valid voice requirement, and sends the valid voice requirement to the processor 1039. The processor 1039 directly converts the received voice signal into a processing instruction and a target area of the data to be processed by using a voice recognition technology, and converts input reference data in a text form into a reference voice according to the processing instruction of the data to be processed by using a text-to-voice technology, reads the data to be processed from the memory 1049, and processes the reference voice according to voice features of the voice of the data to be processed, such as voice intonation. Finally, the reference voice is inserted into the target area in the voice to be processed and smoothed to obtain processed voice data. If an ending massage sent from a user is received, the processing ends and then the data can be output; otherwise, the user's processing requirement continues to be received until the ending message sent from the user is received. A form of the ending message may be a voice form, an image form, or a form in which the user obtains information by clicking an end button, which is not limited herein.

As another example of the above processing, the input data to be processed is a segment of Chinese text, and an input processing requirement is a segment of voice (requiring the Chinese text to be translated into a segment of English speech suitable for formal occasions). The instruction converter 1029 parses the voice processing requirement into an operation instruction and a target area. According to the input voice requirement, the processor 1039 translates the Chinese text into English text with formal words and formal grammars at first, and then converts the English text into voice data with formal voice intonation by using a text-to-speech technology and calling a processed voice database in the memory 1049. If an ending massage sent from a user is received, the processing ends and then the data can be output; otherwise, the user's processing requirement continues to be received until the ending message sent from the user is received. A form of the ending message is not limited herein, and may be a voice form, an image form, or a form in which the user obtains information by clicking an end button.

In an example, the first signal recognizer 1021 converts the signal into valid text information according to the voice recognition technology, the image recognition technology, the natural language processing technology, etc., and stores the text information into the first storage module. The signal text converter 1022 obtains the text information from the first storage module, converts the text information into the processing instruction according to the natural language processing technology and the target signal instruction conversion model, and stores the processing instruction in the first storage module. The first image recognizer 1023 divides the data to be processed into areas according to the granularity of a semantic area in the processing instruction and the image recognition technology, obtains the target data, and then stores a division result and the target data into the second storage module.

Figure 3:
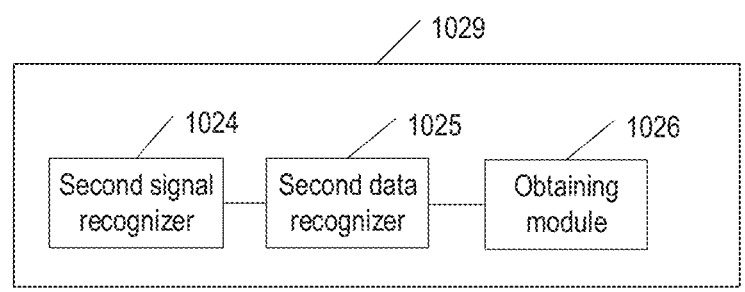
FIG. 3 is a partial structural diagram of another signal processing device according to one example of the present disclosure.

In an example, as shown in FIG. 3, the instruction converter 1029 may further include:

a second signal recognizer 1025 configured to directly convert the signal into the processing instruction according to the voice recognition technology, the natural language processing technology, and the target signal instruction conversion model, and stores the processing instruction into the first storage module.

Optionally, the second signal recognizer 1025 may include one or more sub-recognizers. For instance, a voice signal sub-recognizer recognizes a voice signal according to the voice recognition technology, and an image signal sub-recognizer recognizes a valid signal of an image or multiple images through the image recognition technology.

Procedures of the image signal processing a group of images are described as follows. For instance, a camera is used to collect multiple images, and an image signal sub-recognizer is used to segment a collected image and remove invalid information, which means to segment a foreground and a background of the image and remove the background information as well as obtain the foreground information, then relevant information such as a position and a size of one or more targets can be determined. Specifically, an edge detection technology is used to determine a position and a range of a human face, a human hand, and a human skeleton structure at first; secondly, a target is recognized, and if there are multiple candidate targets, a priority of each candidate target is determined; finally, a valid target is selected, and a target tracking technology is used to track the target's motion trail to obtain a meaning expressed by the target. For instance, if the face and the skeleton structure of a person are basically unchanged while the human hand slides from left to right, the obtained valid information is to move target data of the data to be processed from the left to the right, and then the valid image information is converted into text information.

Procedures of the text signal processing a piece of text are described as follows. For instance, a text information collector is used to obtain a piece of text information, and a text signal sub-recognizer is used to segment collected text to form a text vector. Then a text feature extraction technology is used to select valid text information. Combined with a text matching model generated through offline training, valid collected text information is converted into text information that can be sent to the signal text converter.

Processing procedures of the multiple signals are described as follows. For instance, if two or more signal collectors collect signals, assuming a voice signal and an image signal, the voice signal is processed by a voice signal sub-recognizer to be text information corresponding to the voice signal, and the image signal is processed by an image signal sub-recognizer to be a preset type of information corresponding to the image signal.

The second image recognizer 1025 divides the data to be processed according to the granularity of the semantic area of the data to be processed according to the processing instruction to obtain target data, where the target data is an area in which the data to be processed is processed, and further stores a division result and the target data into a second storage module.

Optionally, before the signal collector 1019 collects the signal and the data to be processed, the instruction converter 1029 may implement adaptive training on the signal instruction conversion model to obtain the target signal instruction conversion model.

The adaptive training on the signal instruction conversion model is implemented offline or online.

Specifically, the adaptive training on the signal instruction conversion model being implemented offline refers to that the instruction converter 1029 may implement adaptive training on the signal instruction conversion model on the basis of hardware of the instruction converter 1029 to obtain the target signal instruction conversion model. The adaptive training on the signal instruction conversion model being implemented online refers to that a cloud server different from the instruction converter 1029 may implement adaptive training on the signal instruction conversion model to obtain the target signal instruction conversion model. When the instruction converter 1029 needs to use the target signal instruction conversion model, the instruction converter 1029 obtains the target signal instruction conversion model from the cloud server.

Optionally, the adaptive training implemented on a signal instruction conversion model is supervised or unsupervised.

Specifically, the adaptive training implemented on the signal instruction conversion model being supervised refers to that:

the instruction converter 1029 converts the signal into a prediction instruction according to the signal instruction conversion model; determines a correlation coefficient between the prediction instruction and a corresponding instruction set of the prediction instruction, where the instruction set is a set of instructions obtained manually from the signals; and optimizes the signal instruction conversion model according to the correlation coefficient between the prediction instruction and the corresponding instruction set of the prediction instruction to obtain the target signal instruction conversion model.

In an example, the signal processing device 100 may further include:

a trainer 1059 configured to convert the signal into a prediction instruction according to the signal instruction conversion model, determine a correlation coefficient between the prediction instruction and a corresponding instruction set of the prediction instruction, and optimize the signal instruction conversion model according to the correlation coefficient between the prediction instruction and the corresponding instruction set of the prediction instruction to obtain the target signal instruction conversion model.

For instance, the adaptive training implemented on a signal instruction conversion model being supervised may include: the instruction converter 1029 or the trainer 1059 receives a segment of voice signals containing related commands such as changing a color of an image or spinning an image. Each command corresponds to one instruction set. For the input voice signal used for adaptive training, the corresponding instruction set is known. The instruction converter 1029 or the trainer 1059 views the voice signals as the input data of the signal instruction conversion model to obtain an output prediction instruction. The instruction converter 1029 or the trainer 1059 computes the correlation coefficient between the prediction instruction and the corresponding instruction set of the prediction instruction, and adaptively updates parameters (such as weights, biases, and the like) in the signal instruction conversion model to improve performance of the signal instruction conversion model and obtain the target signal instruction conversion model.

Taking an image signal as an example, the instruction converter 1029 or the trainer 1059 receives a segment of image signals containing related commands such as specifying an object in the image through a gesture, and then requiring the object to be moved to the right. Each command corresponds to an instruction set. For the input image signal used for adaptive training, the corresponding instruction set is known. The instruction converter 1029 or the trainer 1059 takes the image signals as the input data of the signal instruction conversion model to obtain an output prediction instruction. The instruction converter 1029 or the trainer 1059 computes the correlation coefficient between the prediction instruction and the corresponding instruction set of the prediction instruction, and adaptively updates parameters (such as weights, biases, and the like) in the signal instruction conversion model to improve performance of the signal instruction conversion model and obtain the target signal instruction conversion model.

The image processing device 100 may further include:

a memory 1049 configured to store the text information, the processing instruction, or the target data.

In an example, the storage module 1049, the first storage module, and the second storage module may be identical or different storage modules.

A processor 1039 may be configured to process the data to be processed according to the processing instruction and the target processing model.

In an example, in an aspect of converting the signal into a processing instruction and target data according to the target signal instruction conversion model, where the target data is processing data of the data to be processed, the instruction converter 1029 may be specifically configured to:

convert the signal into an image processing instruction and a target area according to a target signal instruction conversion model, where the target area is a processing area of an image to be processed.

In an aspect of processing the target data according to the processing instruction and a target processing model, the processor 1039 may be specifically configured to:

process the target area according to the image processing instruction and a target image processing model.

In an example, in an aspect of converting the signal into a processing instruction and target data according to the target signal instruction conversion model, where the target data is processing data of the data to be processed, the instruction converter 1029 may be specifically configured to:

convert the signal into an image processing instruction and a target area according to the target signal instruction conversion model, where the target area is a processing area of an image to be processed.

In an aspect of processing the target data according to the processing instruction and a target processing model, the processor 1039 may be specifically configured to:

process the image to be processed according to the image processing instruction and the target image processing model to obtain a processed image, and convert the processed image into output information.

In the examples of the present disclosure, for image processing, the processing instruction may be an image processing instruction, and the target processing model may be a target image processing model.

Optionally, in an aspect of converting the processed image into output information, the processor 1039 may be specifically configured to:

obtain a conversion instruction, where the conversion instruction includes a specified data type, and the specified data type includes one of the following types: a voice type, an image type, and a text type;

when the specified data type is an image type, output the processing image;

when the specified data type is a text type, output text information; and when the specified data type is a voice type, output voice information.

The above specified data type may include, but not limited to, one of the following types: a voice type, an image type, and a text type, which is not limited herein. The specified data type may be set by a user or defaulted by a system. When the data type is specified to be an image type, the processed image is output directly; when the data type is specified to be a text type, the text information is output; and when the data type is specified to be a voice type, the voice information is output.

Figure 4A:
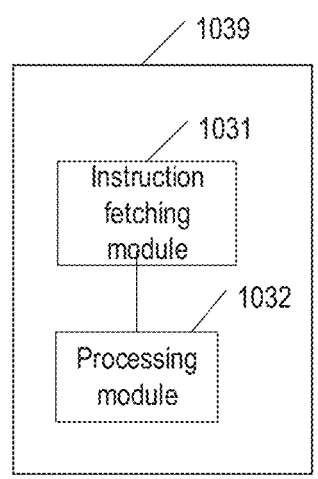
FIG. 4A is a partial structural diagram of another signal processing device according to one example of the present disclosure.

As shown in FIG. 4A, the processor 1039 may include:

an instruction fetching module 1031 configured to obtain M processing instructions from the storage module in a preset time window, where M is an integer greater than one; and a processing module 1032 configured to process the target data according to the M processing instructions and the target processing model.

Optionally, the processing module 1032 may be configured to:

delete processing instructions with identical functions in the M processing instructions to obtain N processing instructions, where N is an integer smaller than the M; and process the target data according to the N processing instructions and the target processing model.

Specifically, the preset time window may refer to a preset time period. After the instruction fetching module 1031 obtains M processing instructions from the storage module 104 in the preset time period, the processing module 1032 compares every two of the M processing instructions, deletes instructions with identical functions from the M processing instructions to obtain N processing instructions. The processing module 1032 processes the data to be processed according to the N processing instructions and the target processing model.

Examples are given to illustrate the method for the processing module 1032 comparing every two of the M processing instructions. When a processing instruction A and a processing instruction B are identical, the processing module 1032 deletes the one with bigger overhead in the processing instruction A and the processing instruction B; and when the processing instruction A and the processing instruction B are different, the processing module 1032 obtains a similarity coefficient between the processing instruction A and the processing instruction B. When the similarity coefficient is greater than a similarity threshold, it is determined that the processing instruction A and the processing instruction B have identical functions, and the processing module 1032 deletes the one with bigger overhead in the processing instruction A and the processing instruction B; when the similarity coefficient is lower than the similarity threshold, the processing module 1032 determines that the processing instruction A and B have different functions. The processing instructions A and B refer to any two of the M processing instructions.

Specifically, both input and output of the processor 1039 are images. The processor 1039 may process the data to be processed by methods including but not limited to ANN and traditional computer vision-based methods. The processing includes, but is not limited to: body shape (such as leg sliming and breast augmentation), face change, face beautification, object change (a cat for a dog, a horse for a zebra, an apple for an orange, and the like), background change (a field for a forest), de-occlusion (such as reconstructing an occluded eye on the face), style conversion (changing into a Van Gogh style in one second), pose change (such as standing for sitting, a frontal face for a profile), changing a non-oil painting to an oil painting, changing a background color of an image and a background season of an object in the image, image synthesis, image fusion, removing an object or a shadow, image coloring, image compression, image vectorization, etc.

As shown in FIG. 4B, if multiple images are input, one or more of the multiple images are processed in sequence at a time. For instance, if six images need to be spliced, two images are spliced at a time and the images are labelled with images 1-6 respectively.

A1: A signal collecting unit receives a voice signal and preprocesses the voice signal to reduce invalid information such as noise;

A2: The signal collecting unit sends a preprocessed voice signal to an instruction conversion unit, parses the voice signal through a voice recognition technology, and converts the voice signal into a predefined image processing instruction;

A3: An image processing unit receives the image processing instruction, locates and divides one or more images to be processed through an image recognition technology according to the instruction to obtain a target area to be processed corresponding to the one or more images;

A4: If operation data is required, the operation data is read from a storage unit and then sent to the image processing unit;

A5: The image processing unit performs a given operation on the target area of the image to be processed by using the operation data according to a processing instruction;

A6: If processing of the image is not completed, a processed image is stored into the storage unit.

Furthermore, if one or more new images are read in, the steps A3 to A6 can be repeated until all the images are processed. Results of each processing are read in and processed according to the image processing instruction to obtain a final processing result and output the image.

As shown in FIG. 4C, image synthesis is illustrated as an example. Six images with different degrees of exposure are processed in a manner of exposure synthesis, and 2 images are processed at a time.

B1: A signal collecting unit receives a voice signal and preprocesses the voice signal to reduce invalid information such as noise;

B2: The signal collecting unit sends a preprocessed voice signal to an instruction conversion unit, parses the voice signal through a voice recognition technology, and converts the voice signal into a predefined image processing instruction;

B3: An image processing unit receives the image processing instruction, locates and divides one or more images to be processed through an image recognition technology according to the instruction to obtain a target area corresponding to the one or more images;

B4: If operation data is required, the operation data is read from a storage unit and then sent to the image processing unit;

B5: The image processing unit performs a given operation on the target area of the image to be processed by using the operation data according to a processing instruction;

B6: If processing of the image is not completed, a processed image is stored into the storage unit.

Furthermore, if one or more new images are read in and the processed image in the previous step is processed together as a new image, the steps B3-B5 can be repeated. When all the images are processed, the final processing result is obtained by B5 and the image is output.

Optionally, for inputting one or more images, the one or more image may be processed according to the image processing model to obtain required text information and output the required text information, so as to achieve following functions such as image classification, image recognition, image segmentation, image description, etc., which is not limited herein. The image processing model may be used to achieve one or more functions such as image classification, image recognition, image segmentation, image description, or the like.

In an example, a process of inputting an image and output classification information is as follows:

C1: A signal collecting unit receives a voice signal and preprocesses the voice signal to reduce invalid information such as noise;

C2: The signal collecting unit sends a preprocessed voice signal to an instruction conversion unit, parses the voice signal through a voice recognition technology, and converts the voice signal into a predefined image processing instruction;

C3: An image processing unit receives the image processing instruction, reads a pre-stored image processing model from the storage unit, processes the input image according to the image processing model to obtain a classification result;

C4: After the operation is completed, the classification result is output.

In an example, a process of inputting an image and outputting the image is as follows:

D1: A signal collecting unit receives a voice signal and preprocesses the voice signal to reduce invalid information such as noise;

D2: The signal collecting unit sends a preprocessed voice signal after to an instruction conversion unit, parses the voice signal through a voice recognition technology, and converts the voice signal into a predefined image processing instruction;

D3: An image processing unit receives the image processing instruction, reads a pre-stored image processing model from the storage unit, divides the input image, extracts one or more target areas, and processes the target data to obtain a complete text description.

D4: If a voice description needs to be output, the text description is converted into a voice through a voice conversion technology for output; otherwise, the text description can be output directly. The operation is completed.

Furthermore, an input may not be voice information, while image information may be output. For instance, text/voice information is input, or text/voice information and image information are input, then the text/voice information is converted into a new image, or content of the text/voice information or the original image information is added or modified.

After voice information is input, the voice information is converted into text information according to an image processing instruction through a voice recognition technology (if text information is input, subsequent processing can be directly performed), and the text information is processed according to a specified or default image specification, a font size, a background color, a pattern, and other requirements to obtain a new image for output, such as a function of converting text content into an image. Optionally, input text information or text information converted from the voice information may be preprocessed at first to remove noise, obvious errors, and the like, which may improve subsequent processing precision.

After voice information is input, the voice information is converted into text information according to an image processing instruction through a voice recognition technology (if text information is input, subsequent processing can be directly performed), and the text information is processed according to a specified or default font size, a background color, a pattern, and other requirements before being added to a specified position in the original image for output, such as a function of barrage. Optionally, input text information or text information converted from the voice information may be preprocessed at first to remove noise, obvious errors, and the like, which may improve subsequent processing precision.

After text information is input, the text information is split according to an image processing instruction. The split text information is processed separately and the content is converted into a corresponding image through a natural speech processing technology. For instance, if an original image is input, addition or modification is directly performed in the original image, otherwise a new image is generated. Then images generated by conversion are stitched and integrated to obtain image content corresponding to an entire piece of text for output. If voice information is input, the voice information may be converted into text information through a voice recognition technology, or be directly understood and analyzed to obtain corresponding image information.

Optionally, before the signal collector 1019 receives the signal, the processor 1039 may implement adaptive training on a processing model to obtain the target processing model.

The adaptive training on the processing model is implemented offline or online. Specifically, the adaptive training on the processing model being implemented offline refers to that the processor 1039 may implement adaptive training on the processing model on the basis of hardware of the processor 1039 to obtain a target signal instruction conversion model; the adaptive training on the processing model being implemented online refers to that the cloud server different from the processor 1039 may implement adaptive training on the processing model to obtain a target processing model. When the processor 1039 needs to use the target processing model, the processor 1039 obtains the target processing model from the cloud server.

Optionally, the adaptive training implemented on a processing model is supervised or unsupervised.

Specifically, the adaptive training implemented on the processing model being supervised refers to that:

for a voice signal, the processor 1039 converts the voice signal into prediction data according to the processing model; then determines a correlation coefficient between the prediction data and corresponding training data of the prediction data, where the target is an image obtained by manually processing data to be processed according to the voice signal; and the processor 1039 optimizes the processing model according to the correlation coefficient between the prediction data and the corresponding training data of the prediction data to obtain the target processing model; and for an image signal, the processor 1039 converts the image signal into prediction data according to the processing model; then determines a correlation coefficient between the prediction data and corresponding training data of the prediction data, where the target is an image obtained by manually processing data to be processed according to the voice signal; and the processor 1039 optimizes the processing model according to the correlation coefficient between the prediction data and the corresponding training data of the prediction data to obtain the target processing model.

In an example, the signal processing device 100 may further include:

the trainer 1059 configured to convert the signal into a prediction instruction according to the signal instruction conversion model, determine a correlation coefficient between the prediction instruction and a corresponding instruction set of the prediction instruction, and optimize the signal instruction conversion model according to the correlation coefficient between the prediction instruction and the corresponding instruction set of the prediction instruction to obtain the target signal instruction conversion model.

For instance, the adaptive training implemented on a processing model being supervised may include: the processor 1039 or the trainer 1059 receives a segment of voice signals containing related commands such as changing the color of an image or spinning an image. Each command corresponds to one piece of training data. For the input voice signal used for adaptive training, the corresponding training data is known. The processor 1039 or the trainer 1059 takes the voice signals as the input data of the processing model to obtain output prediction data. The processor 1039 or the trainer 1059 computes the correlation coefficient between the prediction data and the corresponding training data of the prediction data, adaptively updates parameters (such as weights, biases, and the like) in the signal instruction conversion model to improve performance of the processing model, and then obtains the target processing model.

Taking an image signal as an example, the processor 1039 or the trainer 1059 receives a segment of image signals containing related commands such as changing the color of an image or spinning an image. Each command corresponds to one piece of training data. For the input image signal used for adaptive training, the corresponding training data is known. The processor 1039 or the trainer 1059 takes the image signals as the input data of the processing model to obtain output prediction data. The processor 1039 or the trainer 1059 computes the correlation coefficient between the prediction data and the corresponding training data of the prediction data, adaptively updates parameters (such as weights, biases, and the like) in the processing model to improve performance of the processing model, and then obtains the target processing model.

In an example, the instruction converter 1029 of the signal processing device 100 may be configured to perform adaptive training on the signal instruction conversion model in the instruction converter 1029 to obtain a target signal instruction conversion model. The processor 1039 of the signal processing device 100 may be configured to perform adaptive training on the processing model in the processor 1039 to obtain a target processing model.

In an example, the signal processing device 100 may further include:

the trainer 1059 configured to perform adaptive training on the signal instruction conversion model in the instruction converter 1029 and the processing model in the processor 1039 respectively to obtain a target signal instruction conversion model and a target processing model.

The trainer 1059 is capable of adjusting a structure and a parameter of the signal instruction conversion model or the processing model in a supervised or unsupervised manner to improve performance of the signal instruction conversion model or the processing model and finally obtain the target signal instruction conversion model or the target processing model.

In an example, the signal processing device 100 is presented in the form of modules. The "Module" may refer to an application-specific integrated circuit (ASIC), a processor and a memory executing one or more software or firmware programs, an integrated logic circuit, and/or other components that provide the described functions. In addition, the signal collector 1019, the instruction converter 1029, the processor 1039, the storage module 104, and the trainer 1059 may be implemented by the device shown from FIG. 5A to FIG. 8.

Optionally, the instruction converter 1029 of the signal processing device 100 or the processing module 1032 of the processor 1039 is an artificial neural network chip, which means that the instruction converter 1029 and the processing module 1032 of the processor 1039 are two independent artificial neural network chips. The structures of the instruction converter 1029 and the processing module 1032 are shown from FIG. 5A to FIG. 8 respectively.

In the present device, the instruction converter 1029 and the processing module 1032 may be executed either serially or in a soft-pipelining manner, which means that the instruction converter 1029 may process a next image when the processing module 1032 processes a previous image, which may improve hardware throughput rate and image processing efficiency.

Figure 5A:
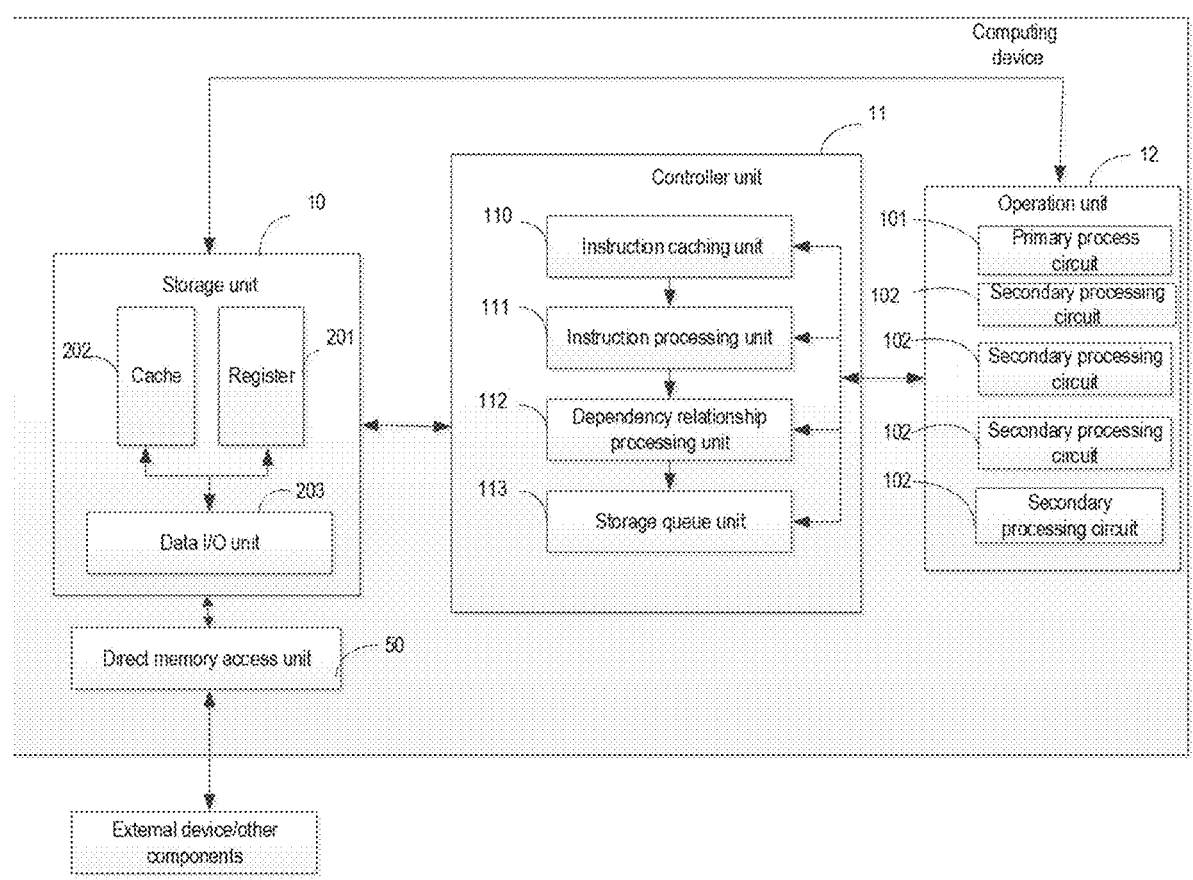
FIG. 5A is a structural diagram of a computing device according to one example of the present disclosure.

Referring to FIG. 5A, a computing device is provided. The computing device is configured to perform a machine learning computation, and includes: a controller unit 11 and an operation unit 12, where the controller unit 11 is connected to the operation unit 12, the operation unit 12 may include: a primary process circuit and multiple secondary processing circuits.

The controller unit 11 may be configured to obtain input data and a computation instruction; optionally, the input data and the computation instruction may be obtained through a data input/output unit, where the data input/output unit may specifically be one or more data I/O interfaces or I/O pins.

The computation instruction includes, but is not limited to, a forward operation instruction, a backward training instruction, or other neural network operation instruction such as a convolution operation instruction. A specific expression of the computation instruction is not limited in the present disclosure.

The controller unit 11 may be further configured to parse the computation instruction to obtain multiple operation instructions, and send the multiple operation instructions and the input data to the primary processing circuit;

a primary processing circuit 101 may be configured to perform pre-processing on the input data, and transfer data and operation instructions among the multiple processing circuits;

multiple secondary processing circuits 102 may be configured to perform an intermediate operation in parallel according to the data and the operation instructions transferred from the primary processing circuit to obtain multiple intermediate results, and transfer the multiple intermediate results to the primary processing circuit; and the primary processing circuit 101 may be configured to perform subsequent processing on the multiple intermediate results to obtain a computing result of the computation instruction.

The technical solution provided in the present disclosure sets the operation module into a one-master and multi-slave structure. For a computation instruction of a forward operation, the operation module may split data according to the computation instruction of a forward operation, so that multiple secondary processing circuits can perform a parallel computation on a part with a large amount of computations, which may increase operating speed, save operating time, and further reduce power consumption.

In an example, the machine learning computation may include an artificial neural network operation. The input data may include input neuron data and weight data. The computing result may specifically be a result of the artificial neural network operation, which is also known as output neuron data A neural network operation may be an operation of one layer of a neural network. For a multi-layer neural network, the implementation process may be executed as follows. In the forward operation, if the forward operation of a previous layer artificial neural network is completed, operation instructions of a next layer will operate the output neuron processed in the operation unit as the input neuron of the next layer (or perform some operations on the output neuron, and then the output neuron is operated as the input neuron of the next layer). At the same time, the weight is also replaced by the weight of the next layer. In the reverse operation, if the reverse operation of a previous artificial neural network is completed, operation instructions of a next layer will operate an input neuron gradient processed in the operation unit as an output neuron gradient of the next layer (or perform some operations on the input neuron gradient, and then the input neuron gradient is operated as the output neuron gradient of the next layer). At the same time, the weight is also replaced by the weight of the next layer.

The machine learning computation may further include support a vector machine operation, a k-nn operation, a k-means operation, a principal component analysis operation, and the like. For the convenience of description, the artificial neural network operation is used as an example to illustrate specific schemes of a machine learning computation.

For an artificial neural network operation, if the artificial neural network operation has a multi-layer operation, and an input neuron and an output neuron of the multi-layer operation do not refer to a neuron in an input layer and an output layer of the entire neural network, but refer to any two adjacent layers in the network, then the neuron in a lower layer of the network forward operation is the input neuron and the neuron in an upper layer of the network forward operation is the output neuron. Taking a convolutional neural network as an example, given that a convolutional neural network has L layers, and K=1, 2, ..., L−1 a $K^{th}$ layer is named as an input layer and the neuron in this layer is the input neuron. A $K+1^{th}$ layer is named as an output layer and the neuron in this layer is the output neuron. In other words, except a top layer, each layer can be used as an input layer, and the next layer is the corresponding output layer.

In an example, the second processor may further include a storage unit 10 and a direct memory access (DMA) unit 50, where the storage unit 10 may include one or any combination of a register and a cache. Specifically, the cache may be configured to store the computation instruction, and the register may be configured to store the input data and a scalar. The cache may be a scratchpad cache. The DMA unit 50 may be configured to read or store data from the storage unit 10.

Optionally, the controller unit may include an instruction caching unit 110, an instruction processing unit 111, and a storage queue unit 113; where the instruction caching unit 110 may be configured to store the computation instruction associated with the artificial neural network operation;

the instruction processing unit 111 may be configured to parse the computation instruction to obtain multiple operation instructions; and the storage queue unit 113 may be configured to store an instruction queue, where the instruction queue may include the multiple operation instructions or the computation instruction to be executed in a sequence.

For instance, in an optional technical solution, the primary processing circuit may also include a control module, where the control module may include a primary instruction processing unit for decoding an instruction into a microinstruction. In another example, another control module may also include a secondary instruction processing unit for receiving and processing the microinstruction. The microinstruction may be obtained by splitting or decoding the instruction, and may be further decoded into control signals of each component, each unit, or each processing circuit.

In an example, the structure of the computation instruction may be shown as in a table below.

| Opcode | Register or Immediate | Register/Immediate data | ... |
| --- | --- | --- | --- |

An ellipsis in the above table indicates that multiple registers or immediate data may be included.

In another alternative technical solution, the computation instruction may include one or more opcode fields and one opcode. The computation instruction may include a neural network operation instruction. Taking the neural network operation instruction as an example, as illustrated in the table below, a register number 0, a register number 1, a register number 2, a register number 3, and a register number 4 may be opcode fields. Each of the register number 0, the register number 1, the register number 2, the register number 3, and register number 4 may correspond to one or more registers.

| Opcode | Register number 0 | Register number 1 | Register number 2 | Register number 3 | Register number 4 |
|---|---|---|---|---|---|
| COMPUTE | Starting address of the input data | Length of the input data | Starting address of the weight | Length of the weight | Address of activation function interpolation table |
| IO | Address of external data memory | Data length | Address of internal data memory | | |
| NOP | | | | | |
| JUMP | Destination address | | | | |
| MOVE | Input address | Data size | Output address | | |

The above registers may be off-chip memories. In practical applications, the above registers may also be on-chip memories for storing data. The data may be n-dimensional data, where n is an integer greater than or equal to one. For instance, if n=1, the data is one-dimensional data (a vector); if n=2, the data is two-dimensional data (a matrix); and if n=3 or above, the data is a multi-dimensional tensor.

In an example, the controller unit may further include a dependency relationship processing unit 108. If multiple operation instructions are provided, the dependency relationship processing unit 108 may be configured to determine whether there exists an associated relationship between a first operation instruction and a zeroth operation instruction before the first operation instruction. If there exists an associated relationship between the first operation instruction and the zeroth operation instruction, the dependency relationship processing unit 108 caches a first operation instruction in the instruction storage unit, and extracts the first operation instruction from the instruction storage unit to the operation module after the zeroth operation instruction is executed.

The determining whether there exists an associated relationship between the first operation instruction and the zeroth operation instruction before the first operation instruction includes:

extracting a first storage address interval of data required (such as a matrix) in the first operation instruction according to the first operation instruction, extracting a zeroth storage address interval of matrix required in the zeroth operation instruction according to the zeroth operation instruction, determining that there exists an associated relationship between the first operation instruction and the zeroth operation instruction if an overlapped area exists between the first storage address interval and the zeroth storage address interval, and determining that there does not exist an associated relationship between the first operation instruction and the zeroth operation instruction if no overlapped area exists between the first storage address interval and the zeroth storage address interval.

Figure 5B:
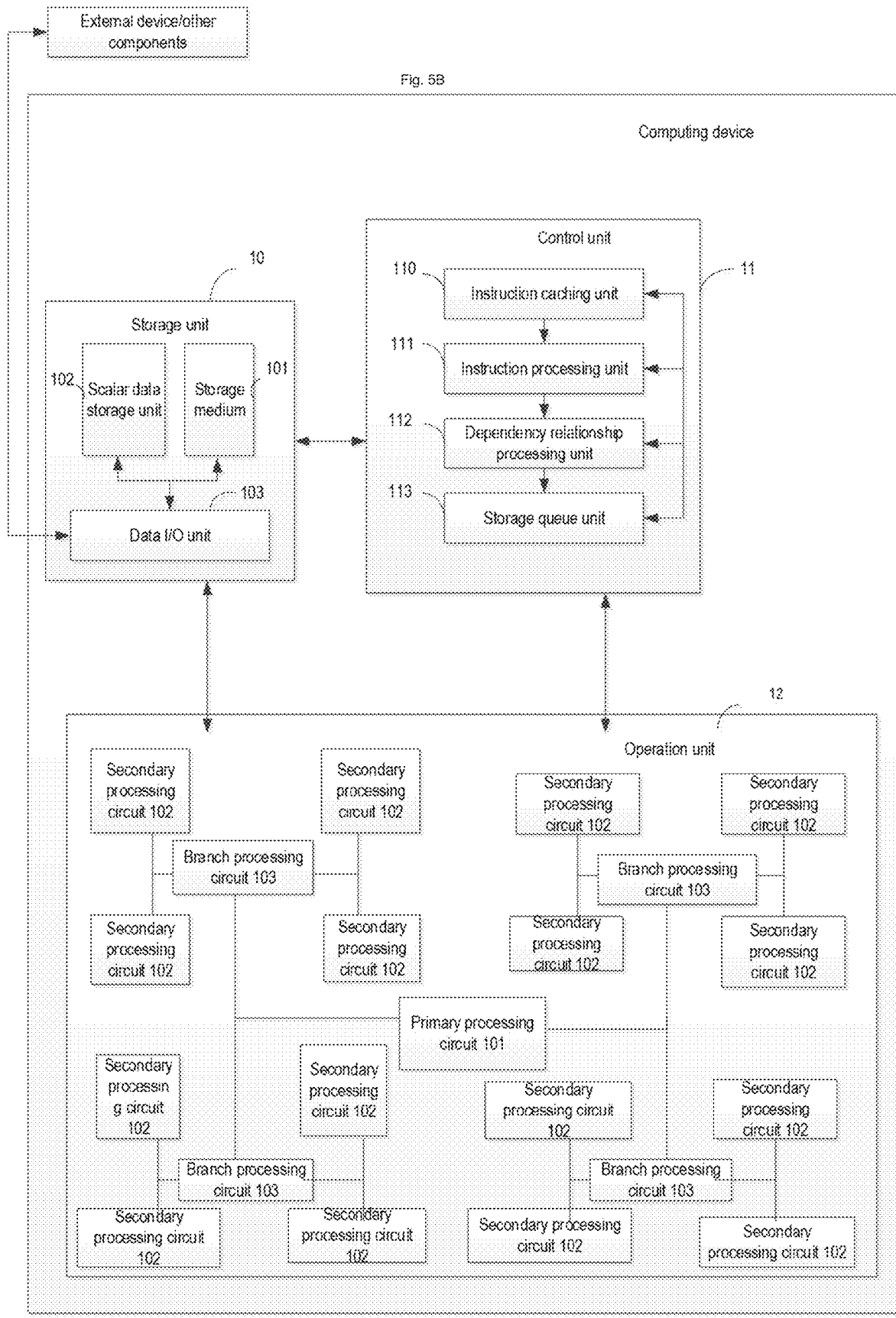
FIG. 5B is a structural diagram of a computing device according to one example of the present disclosure.
Figure 5C:
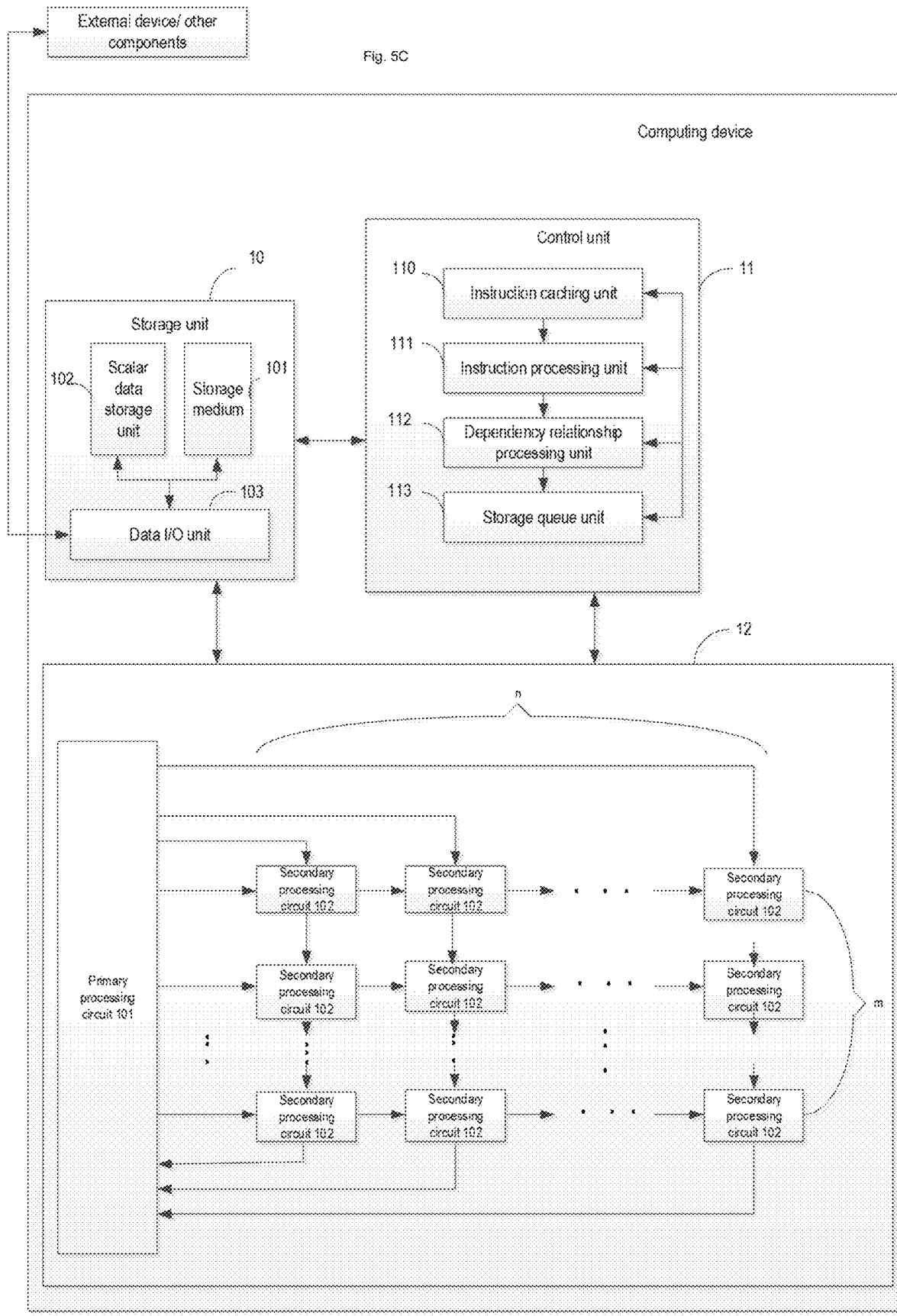
FIG. 5C is a structural diagram of a computing device according to another example of the present disclosure.

In another example, the operation unit 12 as shown in FIG. 5B may include one primary processing circuit 101 and multiple secondary processing circuits 102. In an example, as shown in FIG. 5C, the multiple secondary processing circuits are distributed in an array. Each secondary processing circuit may be connected with adjacent other secondary processing circuits. The primary processing circuit may be connected with K secondary processing circuits of the multiple secondary processing circuits. The K secondary processing circuits may include n secondary processing circuits in a first row, n secondary processing circuits in an $m^{th}$ row, and m secondary processing circuits in a first column. It should be noted that the K secondary processing circuits as shown in FIG. 5C only include n secondary processing circuits in the first row, n secondary processing circuits in the $m^{th}$ row, and m secondary processing circuits in the first column. In other words, the K secondary processing circuits are secondary processing circuits which are directly connected with the primary processing circuit in the multiple secondary processing circuits.

The K secondary processing circuits may be configured to forward data and instructions transferred among the primary processing circuit and the multiple secondary processing circuits.

Figure 5D:
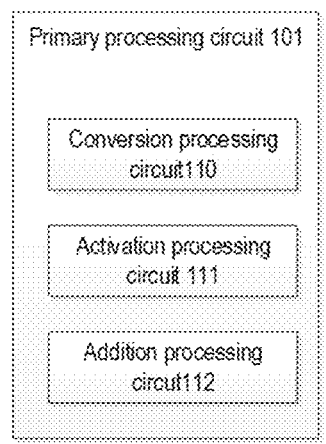
FIG. 5D is a structural diagram of a primary processing circuit according to one example of the present disclosure.

Optionally, as shown in FIG. 5D, the primary processing circuit may further include one or any combination of a conversion processing circuit 110, an activation processing circuit 111, and an addition processing circuit 112; where the conversion processing circuit 110 may be configured to perform interchange (such as conversion between continuous data and discrete data) between a first data structure and a second data structure on a data block or an intermediate result received by the primary processing circuit; or perform interchange (such as conversion between a fixed-point type and a floating-point type) between a first data type and a second data type on a data block or an intermediate result received by the primary processing circuit;

an activation processing circuit 111 may be configured to perform an activation operation on data in the primary processing circuit; and an addition processing circuit 112 may be configured to perform an addition operation or an accumulation operation.

The primary processing circuit may be configured to determine the input neuron to be broadcast data and the weight to be distribution data, distribute the distribution data into multiple data blocks, and send at least one of the multiple data blocks and at least one of the multiple operation instructions to the secondary processing circuit;

the multiple processing circuits may be configured to perform an operation on a received data block according to the operation instruction to obtain an intermediate result, and send an operation result to the primary processing circuit; and the primary processing circuit may be configured to process multiple intermediate results sent by the multiple secondary processing circuits to obtain a result of the computation instruction, and send the result of the computation instruction to the controller unit.

The secondary processing circuit may include:

a multiplication processing circuit configured to perform multiplication on a received data block to obtain a multiplication result;

a forwarding processing circuit (optional) configured to forward the received data block or the multiplication result; and an accumulation processing circuit configured to perform accumulation on the multiplication result to obtain the intermediate result.

In another example, the operation instruction may be a computation instruction such as a matrix multiplication instruction, an accumulation instruction, an activation instruction, and the like.

A specific computing method of the computing device shown in FIG. 5A is described below by using a neural network operation instruction. For a neural network operation instruction, a formula which actually needs to be executed may be $s=s(\Sigma wx_i+b)$. This formula means multiplying a weight w by input data $x_i$, accumulating multiplication results, adding a bias b, and performing an activation operation s(h) to obtain a final output result S.

Figure 5E:
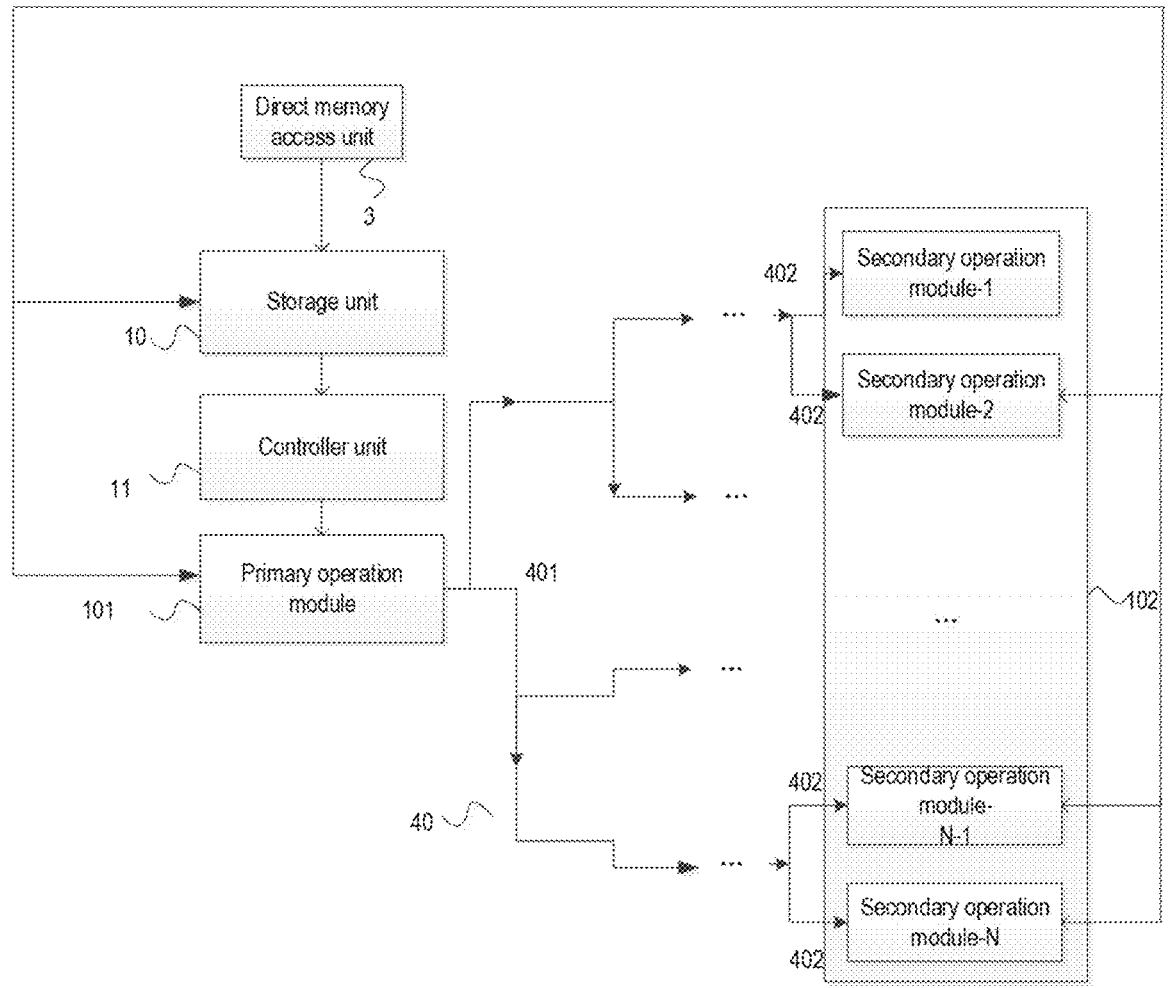
FIG. 5E is a structural diagram of another computing device according to another example of the present disclosure.

In an example, as shown in FIG. 5E, the operation unit includes: a tree module 40, where the tree module includes: a root port 401 and multiple branch ports 404. The root port of the tree module is connected to the primary processing circuit, and the multiple branch ports of the tree module are respectively connected to one of the multiple secondary processing circuits.

Figure 6A:
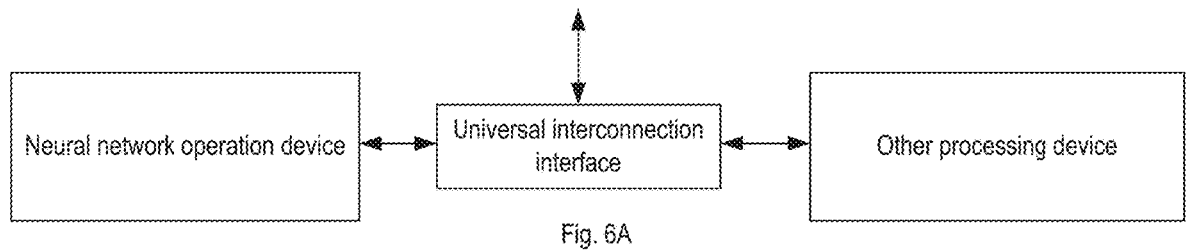
FIG. 6A is a structural diagram of a combined processing device according to one example of the present disclosure.
Figure 6B:
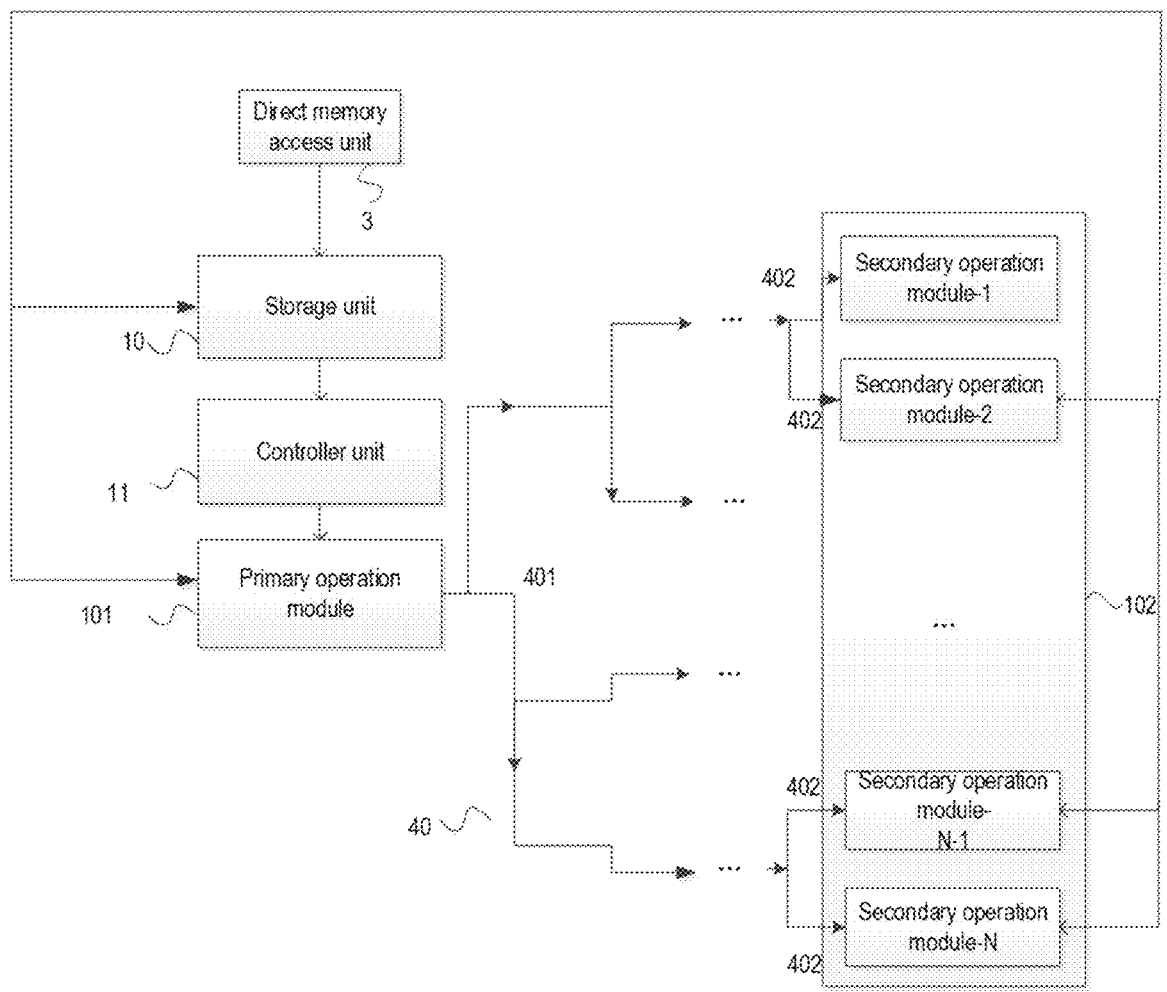
FIG. 6B is a structural diagram of a computing device according to one example of the present disclosure.

The tree module may have a transceiving function. As shown in FIG. 5E, the tree module may have a transferring function. As shown in FIG. 6B, the tree module may have a receiving function.

The tree module may be configured to forward data blocks, weights, and operation instructions among the primary processing circuit and the multiple secondary processing circuits.

Optionally, the tree module is a selectable result of the computing device, and may include at least one layer of nodes. Each node is a line structure with a forwarding function and may not have a computing function. If the tree module has a zero layer of nodes, the tree module may not be needed for the computing device.

Figure 5F:
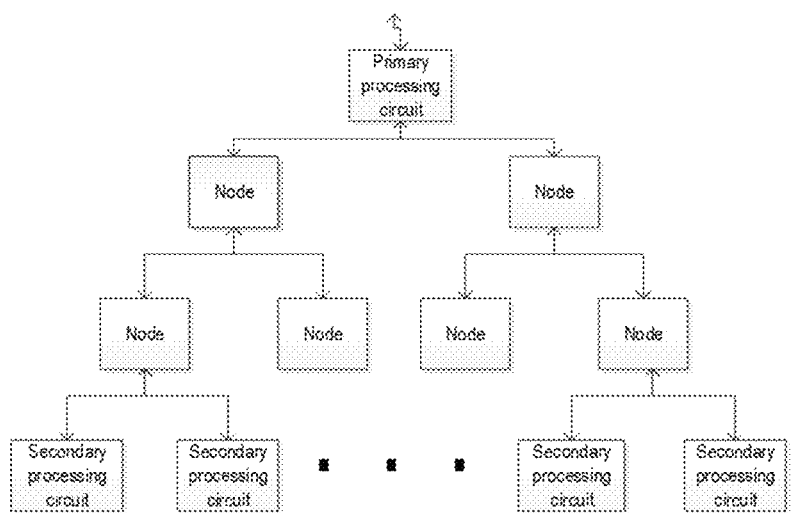
FIG. 5F is a structural diagram of a tree module according to one example of the present disclosure.

Optionally, the tree module may be an n-tree structure, such as a binary tree structure as shown in FIG. 5F, and may also be a tri-tree structure, where n may be an integer greater than or equal to two. The examples of the present disclosure do not limit a specific value of n. The number of layers may be two, and the secondary processing circuit may be connected with nodes of other layers other than nodes of a second last layer. For instance, the secondary processing circuit may be connected with nodes of a first last layer illustrated in FIG. 5F.

Figure 5G:
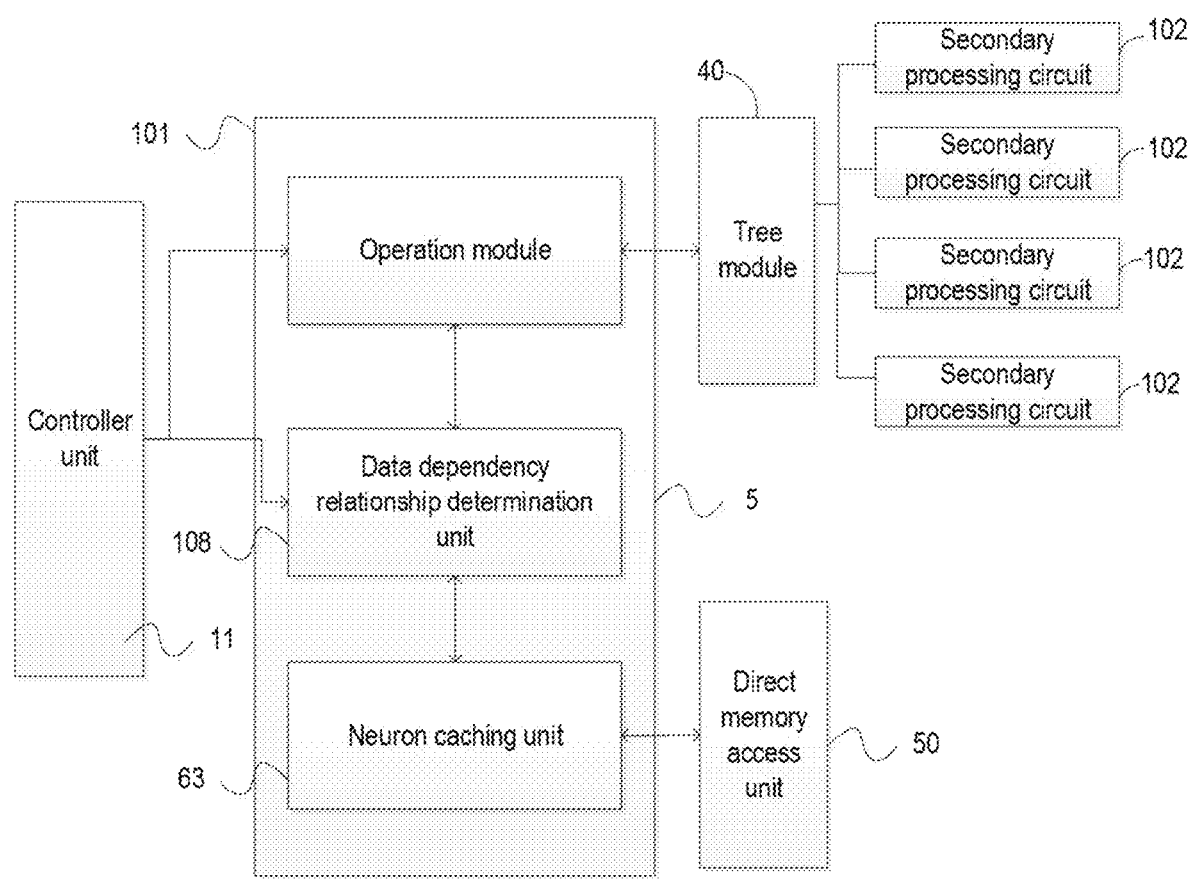
FIG. 5G is a structural diagram of another computing device according to one example of the present disclosure.

Optionally, the operation unit may be provided with a separate cache. As shown in FIG. 5G, the operation unit may include a neuron caching unit 63 configured to cache input neuron vector data and output neuron weight data of the secondary processing circuit.

Figure 5H:
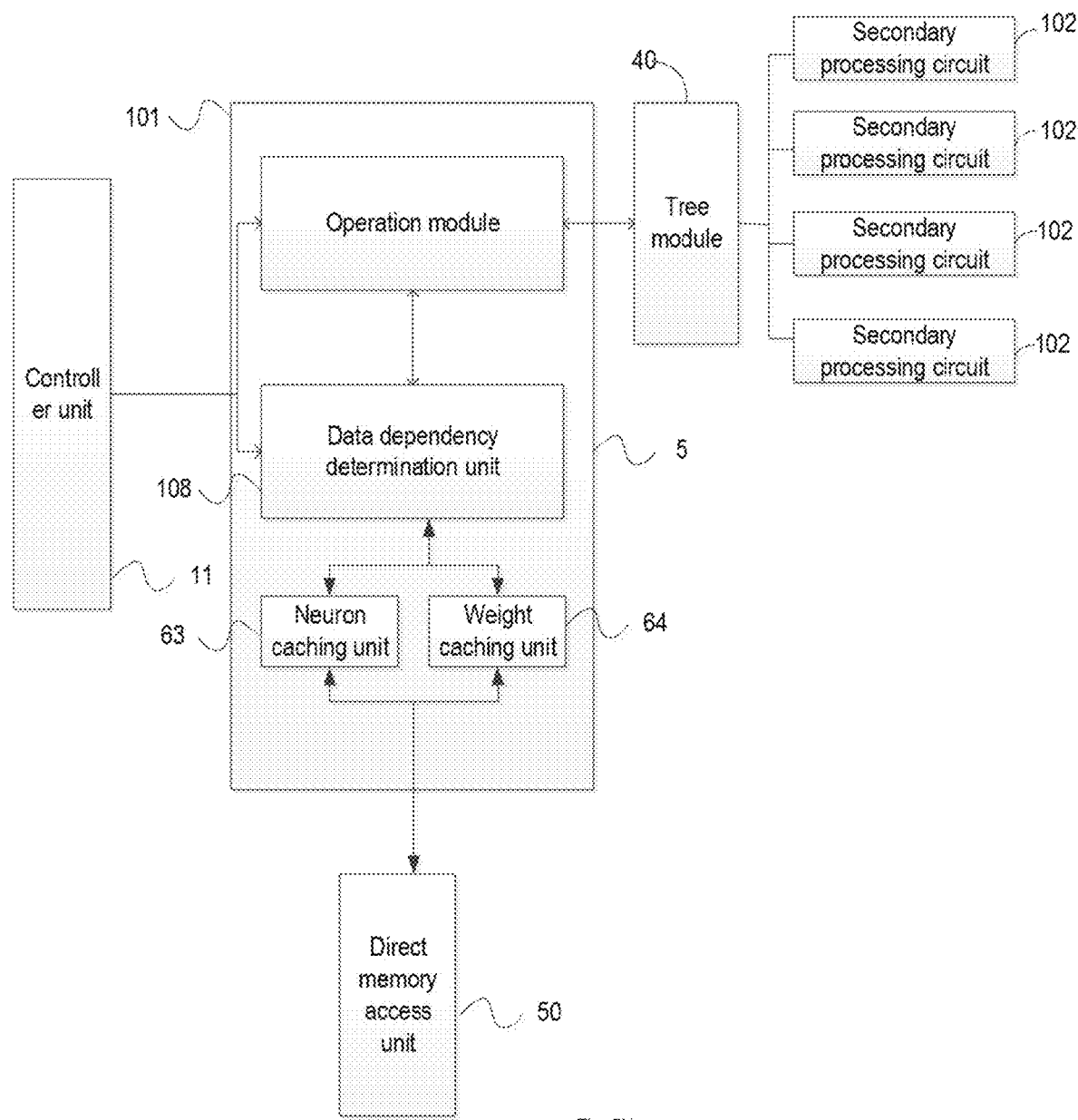
FIG. 5H is a structural diagram of another computing device according to one example of the present disclosure.

As shown in FIG. 5H, the operation unit may further include a weight caching unit 64 configured to cache weight data required by the secondary processing circuit in the computation process.

In an example, as shown in FIG. 5B, the operation unit 12 may include a branch processing circuit 103, and a specific connection structure of the branch processing circuit 103 is shown in FIG. 5B, where the primary processing circuit 101 may be connected with the branch processing circuit 103 (one or more), and the branch processing circuit 103 is connected to one or more secondary processing circuits 102; and the branch processing circuit 103 may be configured to execute data or instructions among the primary processing circuit 101 and the secondary processing circuit 102.

In an example, a fully connected operation in the neural network operation is described as an example. The operation process may be expressed as y=f(wx+b), where x is an input neuron matrix, w is a weight matrix, b is a bias scalar, and f is an activation function. The activation function f may be one of sigmoid function, tanh function, relu function, and softmax function. In this example, assuming a binary tree structure with 8 secondary processing circuits 102 is provided, the implementation may be as follows:

obtaining, by the controller unit, the input neuron matrix x, the weight matrix w, and a fully connected operation instruction from the storage unit; and sending, by the controller unit, the input neuron matrix x, the weight matrix w, and the fully connected operation instruction to the primary processing circuit;

determining, by the primary processing circuit, the input neuron matrix x and the weight matrix w to be broadcast data and distribution data respectively; dividing, by the primary processing circuit, the weight neuron matrix w into eight sub-matrices; distributing, by the primary processing circuit, the eight sub-matrices to the eight secondary processing circuits through the tree module; and broadcasting, by the primary processing circuit, the input neuron matrix x to the eight secondary processing circuits;

performing, by the secondary processing circuit, multiplication and accumulation operations of the eight sub-matrices and the input neuron matrix x in parallel to obtain eight intermediate results; and sending, by the secondary processing circuit, the eight intermediate results to the primary processing circuit; and ranking, by the primary processing circuit, eight intermediate results to obtain an operation result of wx; performing, by the primary processing circuit, a bias b operation on the operation result; performing, by the primary processing circuit, an activation operation to obtain a final result y and sending the final result y to the controller unit; and outputting or storing, by the controller unit, the final result y into the storage unit.

The method for performing the neural network forward operation instruction by the computing device is illustrated in FIG. 5A, which may include:

extracting, by the controller unit, a neural network forward operation instruction, and an opcode field and at least one opcode corresponding to the neural network operation instruction from the instruction caching unit; sending, by the controller unit, the opcode field to a data access unit; and sending, by the controller unit, the at least one opcode to the operation unit.

The controller unit extracts a weight w and a bias b corresponding to the opcode field from the storage unit (if b is zero, the bias b does not need to be extracted). The weight w and the bias b are sent to the primary processing circuit of the operation unit, and the controller unit extracts input data Xi from the storage unit, and sends the input data Xi to the primary processing circuit.

The primary processing circuit determines a multiplication operation according of the at least one opcode, determines the input data Xi to be broadcast data, determines the weight data to be distribution data, and divides the weight w into n data blocks.

The instruction processing unit of the controller unit determines a multiplication instruction, a bias instruction, and an accumulation instruction according to the at least one opcode, and sends the multiplication instruction, the bias instruction, and the accumulation instruction to the primary processing circuit. The primary processing circuit broadcasts the multiplication instruction and the input data Xi to the multiple secondary processing circuits, and distributes the n data blocks to the multiple secondary processing circuits (for instance, if there are n secondary processing circuits, each secondary processing circuit is distributed with one data block). The multiple secondary processing circuits may be configured to perform a multiplication operation on the input data Xi and received data blocks to obtain intermediate results according to the multiplication instruction, and send the intermediate results to the primary processing circuit. The primary processing circuit performs an accumulation operation on the intermediate results sent by the multiple secondary processing circuits to obtain an accumulation result according to the accumulation instruction, performs an addition operation on the accumulation result and the bias b to obtain a final result according to the bias instruction, and sends the final result to the controller unit.

In addition, an order of the addition operation and the multiplication operation may be reversed.

The technical solution provided by the present disclosure may implement a multiplication operation and a bias operation of a neural network through an instruction (a neural network operation instruction), and intermediate results obtained by the neural network operation may not need to be stored or extracted, which may reduce the storage and extraction operations of intermediate data. Therefore, the technical solution provided by the present disclosure may reduce corresponding operational steps and improve the computational effect of the neural network.

A machine learning operation device may be further provided. The machine learning operation device may include one or more computing devices mentioned in the present disclosure for obtaining data to be processed and control information from other processing devices, performing specified machine learning computations, and sending execution results to peripheral devices through I/O interfaces. The peripherals include cameras, monitors, mice, keyboards, network cards, WIFI interfaces, servers, and the like. If multiple computing devices are provided, the computing devices may link and transfer data with each other through a specific structure. For instance, data may be interconnected and transferred via a PCIE bus, so as to support larger scale machine learning computations. In this case, the multiple computing devices may share the same control system, or have separate control systems. Further, the multiple computing devices may share the same memory, or each accelerator may have separate memories. In addition, the interconnection method may be any interconnection topology.

The machine learning operation device may have high compatibility and may be connected with various types of servers through the PCIE interface.

The present disclosure also discloses a combined processing device, which may include the machine learning operation device, a universal interconnection interface, and other processing devices. The machine learning operation device interacts with other processing devices to perform user-specified operations. FIG. 6A is a schematic diagram of the combined processing device.

The other processing devices may include at least one of general purpose/dedicated processors such as a central processing unit (CPU), a graphics processing unit (GPU), a machine learning processor, and the like. The number of processors included in other processing devices is not limited. The other processing devices, served as an interface between the machine learning operation device and external data or control, may include data handling and perform basic control of start and stop operations of the machine learning operation device. The other processing devices may also cooperate with the machine learning operation device to complete a computing task.

The universal interconnection interfaces may be configured to transfer data and control instructions between the machine learning operation device and the other processing devices. The machine learning operation device may obtain input data required from the other processing devices, and write the input data required into on-chip storage devices of the machine learning operation device; may obtain control instructions from the other processing devices, and write the control instructions into on-chip control caches of the machine learning operation device; or may read data in the storage module of the machine learning operation device and transfer the data to the other processing devices.

Figure 7A:
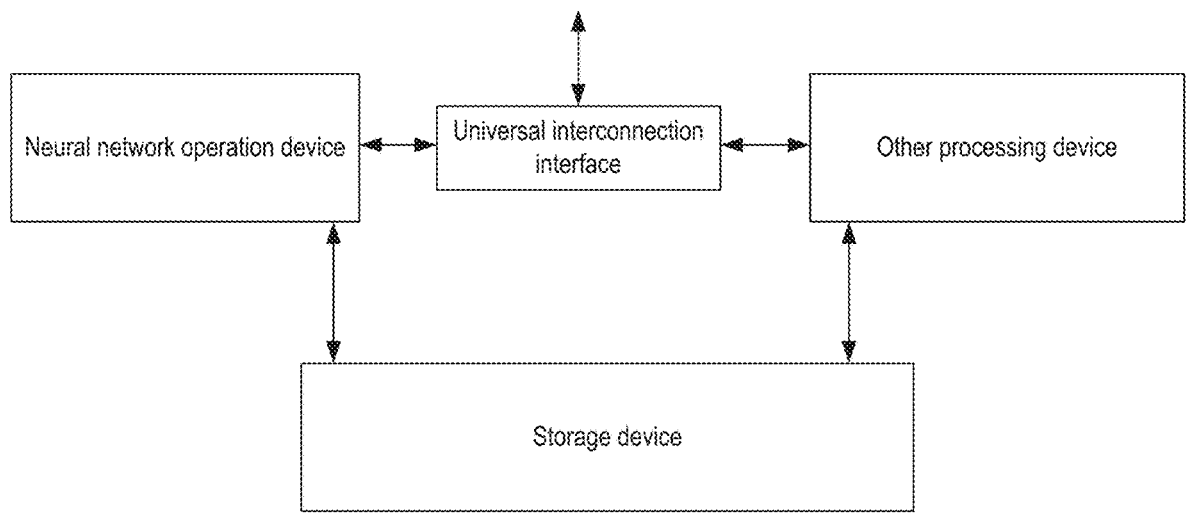
FIG. 7A is a structural diagram of another combined processing device according to one example of the present disclosure.

Optionally, a structure of another combined processing device is as illustrated in FIG. 7A. A storage device may be further provided, and be connected with the machine learning operation device and the other processing devices respectively. The storage device may be configured to store data in the machine learning operation device and the other processing devices, and be particularly suitable for storing data to be processed which may not be completely stored in the internal storage of the machine learning operation device or the other processing devices.

The combined processing device may be used as an SOC on-chip system of devices such as mobile phones, robots, drones, video monitoring devices, etc., which may effectively reduce a core area of control parts, increase processing speed, and reduce overall power consumption. In this case, the universal interconnection interfaces of the combined processing device are connected with certain components of the device. The components may include cameras, monitors, mice, keyboards, network cards, and WIFI interfaces.

In some examples, a chip may be provided, which may include the machine learning operation device or the combined processing device.

In some examples, a chip package structure may be provided, which may include the chip.

Figure 7B:
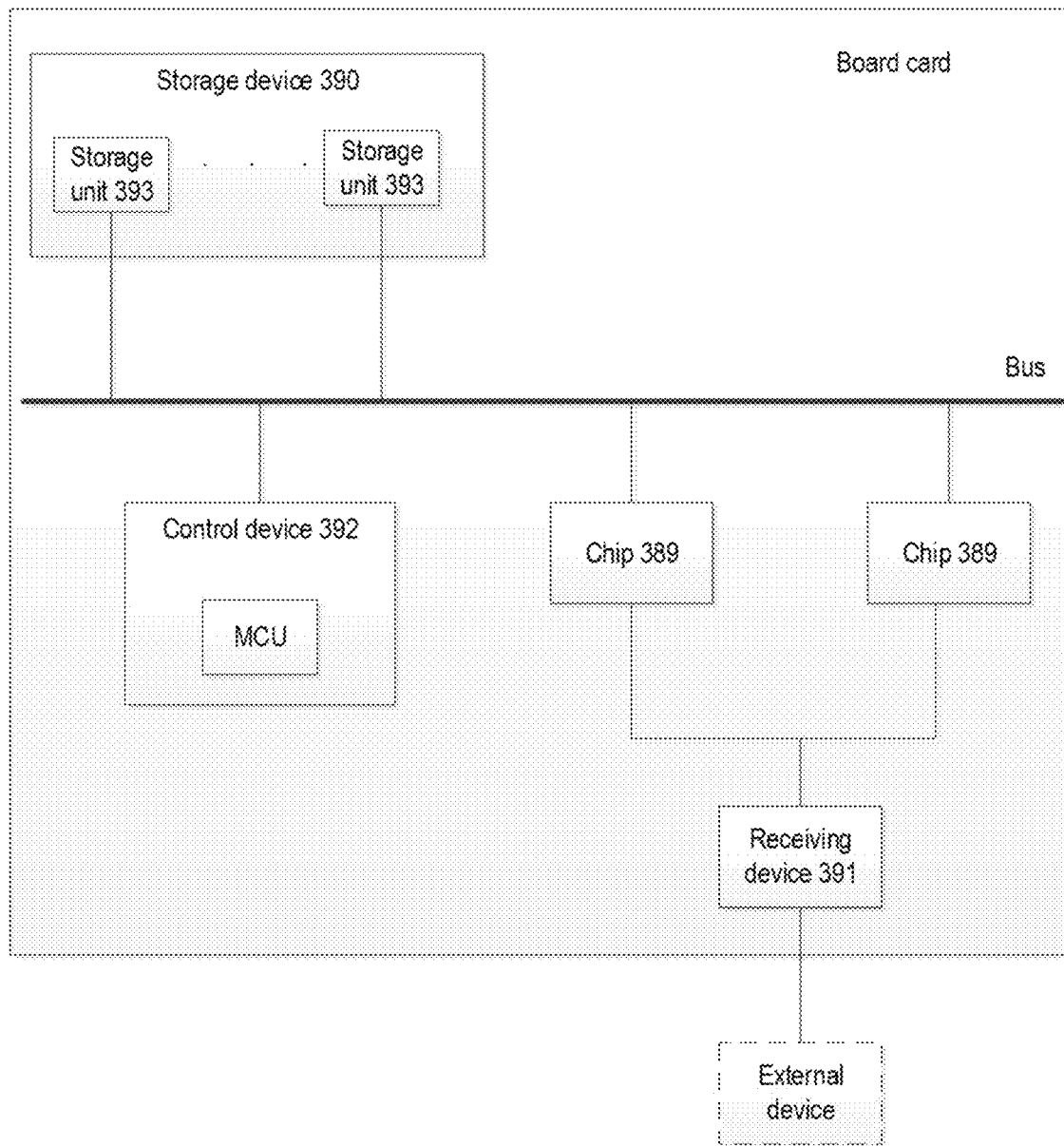
FIG. 7B is a structural diagram of a board card according to one example of the present disclosure.

In some examples, a board card is provided, which may include the chip package structure. Referring to FIG. 7B, a board card is provided. In addition to the chip 389, the board card may also include other supporting components, including but not limited to, a storage device 390, a receiving device 391, and a control device 392.

The storage device 390 is connected with the chip in the chip package structure via a bus for storing data. The memory device may include multiple sets of storage units 393. Each set of the storage units 393 is connected with the chip via the bus. It may be understood that each set of the storage units 393 may be a double data rate synchronous dynamic random access memory (DDR SDRAM).

The double data rate (DDR) is capable to double the speed of SDRAM without increasing the clock frequency. The DDR allows data to be read on rising and falling edges of the clock pulse. The DDR is twice as fast as the standard SDRAM. In an example, the storage device may include four sets of the storage units. Each set of the storage units may include multiple DDR4 particles (chips). In an example, the chip may internally include four 72-bit DDR4 controllers. 64 bits of the 72-bit DDR4 controller are used for data transfer, and 8 bits of the 72-bit DDR4 controller are used for error checking and correcting (ECC) verification. It should be understood that if DDR4-3200 particles are used in each set of the storage units, a theoretical bandwidth of data transfer may reach 25600 MB/s.

In an example, each set of the storage units may include multiple double rate synchronous dynamic random access memories arranged in parallel. The DDR may transfer data twice in one clock cycle. A controller for controlling the DDR is provided in the chip for controlling data transfer and data storage for each of the storage units.

The interface device is electrically connected with the chip within the chip package structure. The interface device may be configured to implement data transfer between the chip and external devices such as a server and a computer. For instance, in an example, the interface device may be a standard PCIE interface. For instance, the data to be processed is transmitted to the chip by the server through a standard PCIE interface to implement data transfer. Preferably, if the data to be processed is transmitted over the PCIE 3.0×16 interface, a theoretical bandwidth may reach 16000 MB/s. In another example, the interface device may also be another interface. The disclosure does not limit a specific representation of the other interfaces, and an interface unit capable of implementing the transfer function will be available. In addition, the computation result of the chip is still sent by the interface device back to the external devices (such as a server).

The control device is electrically connected with the chip. The control device may be configured to monitor the status of the chip. Specifically, the chip may be electrically connected with the control device through an SPI interface. The control device may include a micro controller unit (MCU). For instance, the chip may include multiple processing chips, multiple processing cores, or multiple processing circuits, and multiple loads may be driven. Therefore, the chip may be in different operating states such as multiple loads and light loads. The control device may control the operating states of the multiple processing chips, the multiple processing cores, and/or the multiple processing circuits in the chip.

In some examples, an electronic device is provided, which may include the board card.

The electronic device includes a robot, a computer, a printer, a scanner, a tablet computer, an intelligent terminal, a mobile phone, a drive recorder, a navigator, a sensor, a webcam, a cloud server, a camera, a video camera, a projector, a watch, an earphone, a mobile storage, a wearable device, a transportation means, a household electrical appliance, and/or a medical device.

The transportation means includes an airplane, a ship, and/or a vehicle. The household electrical appliance includes a television, an air conditioner, a microwave oven, a refrigerator, an electric rice cooker, a humidifier, a washing machine, an electric lamp, a gas cooker, and a range hood. The medical device includes a nuclear magnetic resonance spectrometer, a B-ultrasonic scanner, and/or an electrocardiograph.

Figure 8:
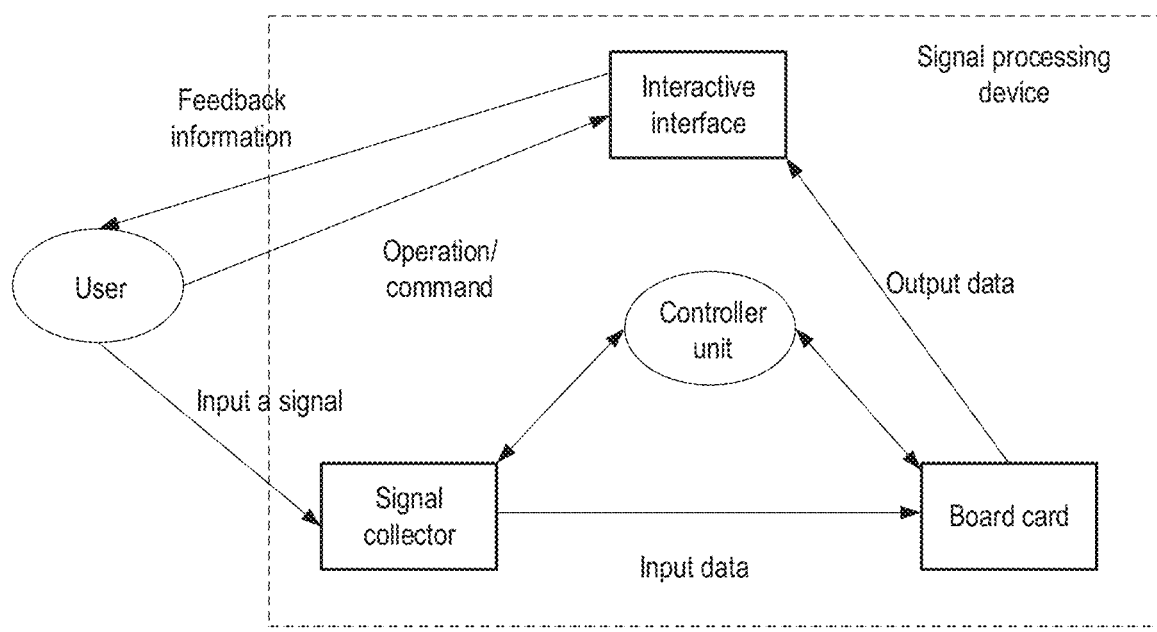
FIG. 8 is a structural diagram of an electronic device according to one example of the present disclosure.

As shown in FIG. 8, a signal collector may be configured to receive a signal, and then transfer the voice and data to be processed to a chip inside a board card as input data.

Optionally, the image processing chip may be an artificial neural network processing chip.

Optionally, the voice collector may be a microphone or a multi-array microphone.

The chip inside the board card including the above examples may be configured to obtain corresponding output data (processed images) and transfer the corresponding output data to an interactive interface.

The interactive interface may be configured to receive output data of the chip (which can be regarded as an artificial neural network processor) and convert the output data into a suitable form of feedback information to display to users.

The control unit may be configured to receive users' operations or commands and control the operation of the whole image processing device.

Optionally, the electronic device may be a data processing device, a robot, a computer, a tablet, an intelligent terminal, a mobile phone, a cloud server, a camera, a video camera, a projector, a watch, an earphone, a mobile storage, or a wearable device.

Figure 9:
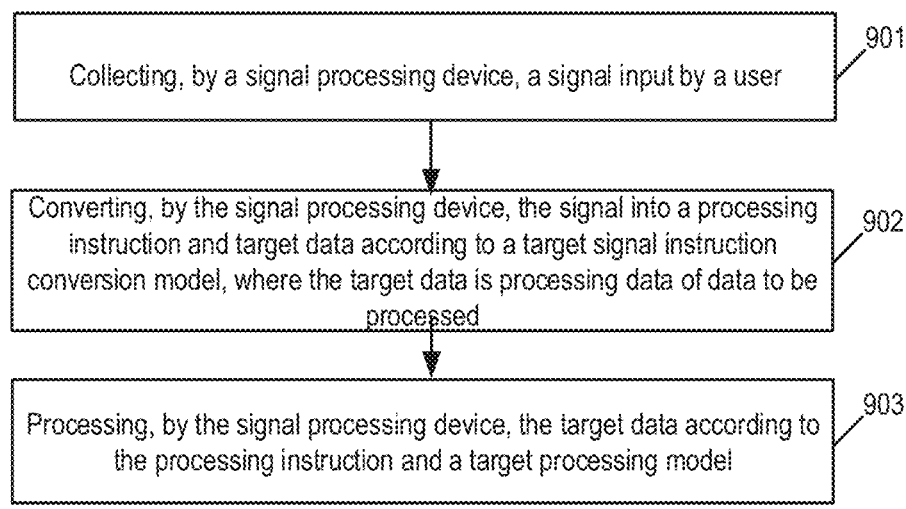
FIG. 9 is a flow chart of a signal processing method according to one example of the present disclosure.

FIG. 9 is a flow chart of a signal processing method according to one example of the present disclosure. The method includes:

a step 901: collecting, by a signal processing device, a signal input by a user; and a step 902: converting, by the signal processing device, the signal into a processing instruction and target data according to a target signal instruction conversion model, where the target data is processing data of data to be processed.

In an example, the converting the signal into a processing instruction and target data according to a target signal instruction conversion model may include the following steps:

converting the signal into text information through a voice recognition technology, an image recognition technology, a natural language processing technology, and the like;

converting the text information into the processing instruction through the natural language processing technology and the target signal instruction conversion model; and dividing the data to be processed into areas according to the granularity of the semantic area in the processing instruction and the image recognition technology to obtain the target data.

In an example, the converting the signal into a processing instruction and target data according to the target signal instruction conversion model may include the following steps:

converting the signal into the processing instruction according to the voice recognition technology, the image recognition technology, the natural language processing technology, and the signal instruction conversion model; and dividing the data to be processed according to the granularity of the semantic area in the processing instruction and the image recognition technology to obtain the target data.

In an example, the method may further include storing text information, or the processing instruction, or the target data.

The method may further include:

a step 903: processing, by the signal processing device, the target data according to the processing instruction and a target processing model.

In an example, the processing target data according to the processing instruction and a target processing model may include the following steps:

obtaining M processing instructions from the storage module in a preset time window, where M is an integer greater than one; and processing the target data according to the M processing instructions and the target processing model.

In an example, the processing the target data according to the M processing instructions and the target processing model may include the following steps:

deleting processing instructions with identical functions in the M processing instructions to obtain N processing instructions, where N is an integer smaller than M;

and processing the target data according to the N processing instructions and the target processing model.

In an example, before receiving a signal and data to be processed, the method may further include implementing adaptive training on the signal instruction conversion model to obtain the target signal instruction conversion model.

In an example, the adaptive training on the signal instruction conversion model is implemented offline or online.

In an example, the adaptive training implemented on the signal instruction conversion model is supervised or unsupervised.

In an example, the implementing adaptive training on the signal instruction conversion model to obtain the target signal instruction conversion model may include:

converting the signal into a prediction instruction according to the signal instruction conversion model;

determining a correlation coefficient between the prediction instruction and a corresponding instruction set of the prediction instruction; and optimizing the signal instruction conversion model according to the correlation coefficient between the prediction instruction and the corresponding instruction set of the prediction instruction to obtain the target signal instruction conversion model.

In an example, before collecting a signal input by a user, the method may further include implementing adaptive training on a processing model to obtain a target processing model.

In an example, the adaptive training on the processing model is implemented offline or online.

In an example, the adaptive training implemented on a processing model is supervised or unsupervised.

In an example, the implementing adaptive training on the processing model to obtain a target processing model may include:

processing the data to be processed according to the processing model to obtain prediction data;

determining a correlation coefficient between the prediction data and corresponding training data of the prediction data; and optimizing the processing model according to the correlation coefficient between the prediction data and the corresponding training data of the prediction data to obtain the target processing model.

In an example, the method may further include: sending interactive information to a user, receiving the user's feedback information, and generating a corresponding instruction based on the feedback information, It should be noted that the implementation process of each step in the method of FIG. 9 will not be further described here. For the details, please refer to the specific implementation process of the signal processing device.

Examples of the present disclosure provide a computer readable storage medium, on which a computer program for electronic data exchange is stored. The computer program enables a computer to execute some or all of the steps described in the above method examples. The computer may include an electronic device.

Examples of the present disclosure further provide a computer program product, which includes a non-volatile computer readable storage medium storing a computer program. The computer program enables a computer to execute some or all of the steps described in the above method examples. The computer program product may be a software installation package. The computer may include an electronic device.

It should be noted that, for the simplicity of descriptions, all the above method examples are described as a series of action combinations. However, those skilled in the art should know that the present disclosure is not limited to the described order of actions, because according to the present disclosure, certain steps may be performed in another order or performed at the same time. Moreover, those skilled in the art should also be aware that the examples described in the specification are alternative examples and that the actions and modules involved are not necessary in the present disclosure.

In the examples, the description of each example has different emphasis. For the parts not described in detail in an example, please refer to related descriptions in other examples.

In the examples of the disclosure, it should be understood that the device disclosed may be implemented in other manners. For instance, the described device examples are merely illustrative; for instance, division of the unit is only a logical function division and can be divided in other manners during actual implementations, for instance, a plurality of units or components may be combined or integrated into another system, or some features may be ignored, or not performed. In addition, coupling or direct coupling or communication connection between each illustrated or discussed component may be indirect coupling or communication connection through some interfaces, devices or units, and may be electrical connection or other forms of connection.

The units described as separate components may or may not be physically separated and the components illustrated as units may or may not be physical units, that is, the units or the components may be in the same place or may be distributed to a plurality of network units. All or part of the units may be selected according to actual needs to achieve the purpose of the technical solutions of the examples.

In addition, functional units in various examples of the present disclosure may be integrated into one processing unit, or each unit may be physically present, or two or more units may be integrated into one unit. The above-mentioned integrated unit can be implemented in the form of hardware.

The examples of the present disclosure are described in detail above and specific examples are used herein to describe the principle and implementation manners of the present disclosure. The description of the above examples is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A signal processing device, comprising:
   a signal collector circuit configured to collect a signal input by a user;
   an instruction converter circuit configured to convert the signal into a processing instruction and target data according to a target signal instruction conversion model, wherein the target data is processing data of data to be processed; and
   a processor configured to process the target data according to the processing instruction and a target processing model;

wherein the processor comprises an instruction fetching circuit configured to obtain M processing instructions as part of the processing instruction from a memory in a preset time window, M being an integer greater than 1, wherein the processor further comprises a processing circuit configured to process the target data according to the M processing instructions and the target processing model; and wherein the processor is configured to delete processing instructions having similar functions based on an overhead comparison and a similarity coefficient of the processing instructions.

2. The signal processing device of claim 1, wherein the instruction converter circuit includes:

a first signal recognizer sub-circuit configured to convert the signal into text information through a signal recognition technology, wherein the signal recognition technology is at least one of following: a voice recognition technology, a semantic understanding technology, an image recognition technology, and a natural language processing technology, a signal text converter sub-circuit configured to convert the text information into the processing instruction through the natural language processing technology and the target signal instruction conversion model, and a first image recognizer sub-circuit configured to divide the data to be processed according to a granularity of a semantic area in the processing instruction and the signal recognition technology to obtain the target data; or wherein the instruction converter circuit includes:

a second signal recognizer sub-circuit configured to convert the signal into the processing instruction according to the signal recognition technology and the target signal instruction conversion model, and a second data recognizer sub-circuit configured to divide the data to be processed according to the granularity of the semantic area of the image to be processed in the processing instruction to obtain the target data.

3. The signal processing device of claim 1, further comprising:

the memory configured to store the text information, or the target data.

4. The signal processing device of claim 1, wherein the deletion of the processing instructions having similar functions based on the overhead comparison and the similarity coefficient of the processing instructions further comprises obtaining N processing instruction, wherein N is an integer smaller than M.

5. The signal processing device of claim 1, wherein the instruction converter circuit is configured to implement adaptive training on the signal instruction conversion model to obtain the target signal instruction conversion model;

wherein the processor is configured to implement adaptive training on the processing model to obtain the target processing model; and wherein the signal processing device is configured to:

before collecting a signal input by a user, implement adaptive training on the signal instruction conversion model to obtain the target signal instruction conversion model; and implement adaptive training on the processing model to obtain the target processing model.

6. The signal processing device of claim 5, wherein the instruction converter circuit is further configured to:

convert the signal into a prediction instruction according to the signal instruction conversion model, determine a correlation coefficient between the prediction instruction and a corresponding instruction set of the prediction instruction, and optimize the signal instruction conversion model according to the correlation coefficient between the prediction instruction and the corresponding instruction set of the prediction instruction to obtain the target signal instruction conversion model;

wherein the processor is further configured to:

process the data to be processed according to the processing model to obtain prediction data, determine a correlation coefficient between the prediction data and corresponding training data of the prediction data, and optimize the processing model according to the correlation coefficient between the prediction data and the corresponding training data of the prediction data to obtain the target processing model;

wherein the signal processing device is configured to:

convert the voice signal into a prediction instruction according to the signal instruction conversion model, determine a correlation coefficient between the prediction instruction and a corresponding instruction set of the prediction instruction, and optimize the signal instruction conversion model according to the correlation coefficient between the prediction instruction and the corresponding instruction set of the prediction instruction to obtain the target signal instruction conversion model; and wherein the signal processing device is further configured to:

process the data to be processed according to the processing model to obtain prediction data, determine a correlation coefficient between the prediction data and corresponding training data of the prediction data, and optimize the processing model according to the correlation coefficient between the prediction data and the corresponding target image to obtain the target processing model.

7. The signal processing device of claim 1, further comprising: a trainer circuit configured to convert the signal into a prediction instruction according to the instruction conversion model, determine a correlation coefficient between the prediction instruction and a corresponding instruction set of the prediction instruction, and optimize the signal instruction conversion model according to the correlation coefficient between the prediction instruction and the corresponding instruction set of the prediction instruction to obtain the target signal instruction conversion model;

wherein the trainer circuit is further configured to:

process the data to be processed according to the processing model to obtain prediction data, determine a correlation coefficient between the prediction data and corresponding training data of the prediction data, and optimize the processing model according to the correlation coefficient between the prediction data and the corresponding training data of the prediction data to obtain the target processing model.

8. The signal processing device of claim 1, wherein the instruction converter circuit further includes:

an interactive circuit configured to send interactive information to users, receive users' feedback information, and generate a corresponding instruction based on the feedback information.

9. A signal processing method, comprising:

collecting a signal input by a user;

converting the signal into a processing instruction and target data according to a target signal instruction conversion model, wherein the target data is part of data to be processed;

obtaining M processing instructions as a part of the processing instruction from a memory in a preset time window, M being an integer greater than 1;

processing the target data according to the M processing instructions and a target processing model; and deleting processing instructions of the M processing instructions having similar functions based on an overhead comparison and a similarity coefficient of the M processing instructions.

10. The signal processing method of claim 9, wherein the converting the signal into a processing instruction and target data according to the target signal instruction conversion model includes:

converting the signal into text information through a signal recognition technology, wherein the signal recognition technology is at least one of the following: a voice recognition technology, a semantic understanding technology, an image recognition technology, and a natural language processing technology, converting the text information into the processing instruction through the natural language processing technology and the target signal instruction conversion model, and dividing the data to be processed into areas according to a granularity of the semantic area in the processing instruction and the image recognition technology to obtain the target data.

11. The signal processing method of claim 9, wherein the converting the signal into a processing instruction and target data according to the target signal instruction conversion model includes:

converting the signal into the processing instruction according to the signal recognition technology and the target signal instruction conversion model, and dividing the data to be processed into areas according to the granularity of the semantic area in the processing instruction and the image recognition technology to obtain the target data.

12. The signal processing method of claim 9, further comprising:

storing the text information, or the processing instruction, or the target data.

13. The signal processing method of claim 9, wherein the deleting processing instructions of the M processing instructions having similar functions based on an overhead comparison and a similarity coefficient of the processing instructions obtains N processing instruction, wherein N is an integer smaller than M.

14. The signal processing method of claim 9, further comprising:

implementing adaptive training on the signal instruction conversion model to obtain the target signal instruction conversion model.

* * * * *